United States Patent

Walker et al.

[11] Patent Number: 5,947,747
[45] Date of Patent: Sep. 7, 1999

[54] METHOD AND APPARATUS FOR COMPUTER-BASED EDUCATIONAL TESTING

[75] Inventors: Jay S. Walker, Ridgefield, Conn.; Bruce Schneier, Oak Park, Ill.; James A. Jorasch, Stamford, Conn.

[73] Assignee: Walker Asset Management Limited Partnership, Stamford, Conn.

[21] Appl. No.: 08/647,301

[22] Filed: May 9, 1996

[51] Int. Cl.⁶ .................................. G09B 5/14; G09B 7/00
[52] U.S. Cl. ................................................ 434/354; 380/9
[58] Field of Search .......................... 380/2, 9; 434/118, 434/350, 354

[56] References Cited

U.S. PATENT DOCUMENTS

| | | | |
|---|---|---|---|
| 4,658,093 | 4/1987 | Hellman | 380/25 |
| 4,967,354 | 10/1990 | Buchanan | 434/350 |
| 5,036,461 | 7/1991 | Elliott et al. | 364/408 |
| 5,050,212 | 9/1991 | Dyson | 380/25 |
| 5,083,271 | 1/1992 | Thacher et al. | 364/411 |
| 5,112,051 | 5/1992 | Darling et al. | 273/148 B |
| 5,155,680 | 10/1992 | Wiedemer | 364/406 |
| 5,193,114 | 3/1993 | Moseley | 380/23 |
| 5,243,654 | 9/1993 | Hunter | 380/51 |
| 5,259,029 | 11/1993 | Duncan, Jr. | 380/4 |
| 5,288,978 | 2/1994 | Iijima | 235/380 |
| 5,319,710 | 6/1994 | Atalla et al. | 380/23 |
| 5,321,611 | 6/1994 | Clark et al. . | |
| 5,347,580 | 9/1994 | Molva et al. | 380/25 |
| 5,349,642 | 9/1994 | Kingdon | 380/25 |
| 5,351,293 | 9/1994 | Michener et al. | 380/21 |
| 5,355,413 | 10/1994 | Ohno | 380/24 |
| 5,359,510 | 10/1994 | Sabaliauskas | 364/410 |
| 5,377,268 | 12/1994 | Hunter | 380/23 |
| 5,386,468 | 1/1995 | Akiyama et al. | 380/25 |
| 5,400,319 | 3/1995 | Fite et al. | 369/275.5 |
| 5,412,575 | 5/1995 | Constant et al. | 364/464.01 |
| 5,416,840 | 5/1995 | Cane et al. | 380/4 |
| 5,434,918 | 7/1995 | Kung et al. | 380/25 |
| 5,513,994 | 5/1996 | Kershaw et al. | 434/356 |
| 5,565,316 | 10/1996 | Kershaw et al. | 434/118 |

OTHER PUBLICATIONS

"Test Scoring Results Avaible Through Email", Hunter www.uww.edu /STIR/apr96/5Test.htm, Apr. 3,1995.
"Test Scoring Optical Scanning" Univ. of Md. pp. 1–2 www.aits.umd.edu/facultystaff/test.html, Jul. 1994.
"Micro Test Score II Plus" pp. 1–4, 1997.
Serial No. 08/561,668 Schneier, et al.

*Primary Examiner*—Salvatore Cangialosi
*Attorney, Agent, or Firm*—Dean Alderucci

[57] ABSTRACT

Methods and apparatuses are disclosed for computer-based evaluation of a test-taker's performance with respect to selected comparative norms. The system includes a home testing computer for transmitting the test-taker's test results to a central computer which derives a performance assessment of the test-taker. The performance assessment can be standardized or customized, as well as relative or absolute. Further, the transmitted test results are configured to reliably associate the student with his test results, using encoding, user identification, or corroborative techniques to deter fraud. Thus, for example, the system allows a parentally-controlled reward system such that children who reach specified objectives can claim an award that parents are confident was fairly and honestly earned without the parent being required to proctor the testing. Fraud, and the need for proctoring, is also deterred during multiple student testing via an option for simultaneous testing of geographically dispersed test-takers.

25 Claims, 19 Drawing Sheets

```
SCORE CODE
NUMBER RIGHT
NUMBER WRONG
WHICH QUESTIONS WERE MISSED
WHICH QUESTIONS WERE ANSWERED FASTEST
WHICH QUESTIONS WERE ANSWERED SLOWEST
SOFTWARE ID
DEVICE ID
ENCODED REPRESENTATION OF PART OR ALL OF THE ABOVE
```
⟩ 1100

FIG. 11(a)

```
PERFORMANCE INDICATION
DEVICE ID
SOFTWARE ID
BASIC COMPARISON STATISTICS
CONTROL MESSAGES:
    -ALTER TEST SOFTWARE
        --DIRECT QUESTIONS TO AREAS OF WEAKNESS
        --ALLOW LESS TIME FOR ANSWERS
    -UNLOCK DISPLAY OF REWARDS
THRESHOLD ATTAINMENT FOR REWARDS
```
⟩ 1150

FIG. 11(b)

METHOD AND APPARATUS FOR COMPUTER-BASED EDUCATIONAL TESTING

BACKGROUND OF THE INVENTION

1. Field of the Invention

The present invention relates generally to methods and apparatuses for computer-based education. More particularly, the invention relates to a computer-based assessment of an individual's educational performance relative to selected comparative norms.

2. Description of the Related Art

Educational software that tests a user's knowledge, coupled with the immediate scoring of answers, is well-known in the art. For home use, a wide range of software is directed to various age groups, although the primary audience is grade-school children. Thus, many educational programs are designed to be quite entertaining, with built-in tests being played as games having an underlying educational purpose. Accordingly, terms such as "student," "player," or "test-taker" shall be understood to mean any participant in, or user of, educational software that tests the user's knowledge in a formal or informal manner.

Software which blends both fun and learning is often referred to as "edutainment" software. Popular edutainment programs include "Mathblaster," "Where in the World is Carmen Sandiego," and "Word Munchers." These edutainment programs (as well as certain other educational programs generally) present players with a series of increasingly difficult tests or puzzles, wherein players must correctly solve the present round before they are allowed to continue to the next round of play.

In the above-mentioned edutainment software, each player exists in isolation from all other players. This arrangement is reasonably well-suited to informal, isolated learning, but lacks the comprehensive data collection/ comparison features needed for formal test administration. For example, without an on-line database of scores, there is no way for a user of educational software to compare his test score with other users' scores. Such inter-player comparisons are useful for assessing accuracy and speed of answers. Comparatives can be calculated and distributed for any given test as a whole, for groups of related questions or for individual questions. Examples of comparisons are as follows: Is a score of 2,350 in Mathblaster a good score for a ten year old? For a fourteen year old? How did all fifth graders do on Level 4 of the multiplication section? Or, in "Where in the World is Carmen Sandiego," is a student at the sixth grade level for naming U.S. state capitols but only at a third grade level for naming foreign countries? Finally, how do these scores vary by school district, state, or perhaps even for children in the same school or class?

Certain home education software applications allow users to be tutored by the software before having to answer a specific question or solve a problem. Still other home education software applications detect specific areas where a user is making errors and automatically adjusts the question type and/or information screens to help the user improve on his weaknesses, after which he is re-tested. This capability permits the software to adjust to the skill strengths and weaknesses of an individual user when measured against predetermined (e.g., programmed into the software at the time of manufacture) and absolute (e.g., percentage of questions answered correctly) norms. However, a drawback of the existing home education software is that it cannot take into account relative norms (e.g., comparisons among a group of users currently taking the test), because of the lack of an on-line database of scores, as mentioned previously.

Another drawback of the existing home education software is that standardized entertainment elements often become repetitive and boring after seeing them for the third or fourth time. Absent rewards or external competitions of some kind, children often stop using the software once the novelty has worn off. Yet, currently available software lacks a reliable and accurate award recognition system that allows a parent to track and reward her child's performance. Such a reward could be contingent on achievement of a standardized norm, as discussed previously. For example, the parent might offer her child a new bicycle in return for the child's achieving mastery of fourth grade reading skills. However, the parent would have to watch the child each time the child finished a test to make sure that the child had indeed scored at the fourth grade level or higher. Thus, there exists a need for educational software that can certify a child's performance against a specified norm without requiring the child's parent to witness or supervise the child's test-taking. Furthermore, if the parent wanted to relate his child's performance to the scores of other children in the same school, grade, or age group, there is no way to determine whether the score achieved by the child meets those comparative criteria.

Finally, current educational software does not allow a parent to define customized reward programs. For example, in a math program having many different modules for different areas, the parent might wish to reward his child for achieving average performance on all modules and superior performance on at least two modules. The measurement of such performance relative to the performance of other children at other locations and times would require an elaborate tracking system.

Another category of educational software runs on networked mainframe-and-terminal systems for large-scale, simultaneous testing of groups of students at fixed locations. In contrast to the edutainment programs, these centralized systems require a human being (e.g., a parent, teacher, or other proctor) to monitor individual users of the software to prevent cheating. The software subsequently retains scores in a local database which allows a teacher to recognize the best students and to ensure that all students have achieved certain minimum requirement levels. Such systems are well-suited for formal testing, but are ill-suited for home-based educational testing because of their hardwired, inflexible configurations and because of the continuous human monitoring requirement.

Yet another category of software is used for a computerized evaluation of standardized tests taken by school children using paper forms. Groups of students simultaneously record their answers to paper-based, multiple-choice questions by blackening ovals on Scantron forms which are optically scanned for grading by software running on computers. A standard paper report is then generated and distributed to each student. These reports, such as the Connecticut Mastery Test administered in the Connecticut primary and secondary schools, or the more widely known SATs, measure a student's comparative performance against all others in his school district as well as in his state. Although these testing systems provide teachers and parents with an evaluative, reliable comparison as to how the student is performing versus his peers, they suffer from other shortcomings that make them illsuited to home-based educational testing. First, the testing methodology (reading printed questions and blackening ovals) is cumbersome and rigid. Second, the methodology does not allow the setting of local performance criteria apart from standardized (but relative) norms programmed into a central mainframe computer. Finally, because the entire test must be taken and submitted to a central computer for grading before test results are returned to the test-takers, there is no interactive feedback mechanism in which future test questions are selected in accordance with ongoing or historical performance.

Furthermore, all of the aforementioned software is ill-suited for at-home testing because the lack of a mechanism to reliably associate a test-taker with his answers allows a dishonest test-taker to obtain test answers from another test-taker. Thus, even the sophisticated hard-wired testing systems typically require human proctoring to ensure security—a condition that may not be available in geographically distributed home testing applications.

Finally, in many instances, a teacher or central authority might want to distribute tests in electronic format for students to take on their home computers. Requiring a simultaneous start time and/or deadline completion for all tested students is necessary to deter cheating in the form of test-taker substitution or a later test-taker obtaining an earlier test-taker's answers to the same test. However, current software does not allow such a configuration.

SUMMARY OF THE INVENTION

In one embodiment of the invention, testing software is incorporated into an "edutainment" game for reporting a user's overall score, along with other subcategories of information (e.g., subject areas within the test material, time taken to answer questions, etc.), as an x-digit numeric test result (e.g., 2340-9908-0011) or "score code." The score code may also include information as to whether or not the software had been altered during the testing procedure. To prevent alteration during the transmission process, the score code is encoded to prevent unauthorized access thereto. For even greater security, a variety of cryptographic protocols are used to make the score code difficult to forge and to also prevent the user from misrepresenting his result to a database located at a central computer.

Whenever the user finishes a game for which the score is good enough to justify "registering," the user via a touch-tone phone calls an 800 number to reach the central computer and registers his score with an interactive voice response unit. Such registration may be mandatory or optional. For example, the software may require registration after a certain number of games by denying access until a confirmation code has been entered.

If the user is calling for the first time, a live operator registers the user's information into a record of a central database having fields containing important comparative factors such as the user's age, grade, school, address, parent's name, password, etc. This "setup" phase could also be accomplished by mail.

For subsequent call-ins, the score registration process is automated. An interactive system prompts the user step-by-step through the registration process, beginning with the user entering a personal ID number and then his score code. The central computer decrypts the score code and saves the decrypted information in the central database for comparative evaluation against an appropriate test benchmark. Such benchmark is typically performed according to demographic or geographic norms determined by the user's registration information.

The test benchmark may even include the user's own past test results. After making the appropriate comparisons, the central computer generates a customized "performance indication" to be provided to the user.

The performance indication may also include a confirmation code to be entered into the user's computer as evidence that he had registered his test results. Prior to acceptance, the testing computer checks the confirmation code to make sure that it is valid. Based on the performance indication and/or confirmation code, the software adjusts future interactions with the user based on the user's past performance. This "reflexive" feature is based on how comparable children answered the same questions, as opposed to being preprogrammed at the time of manufacture or distribution of the software. For example, if a child is performing significantly below his peers in a particular category, the reflexive feature of the software directs the software to focus future test questions in that category.

In addition, the user's comparative results and statistics can be logged to a special review section of the testing program. Access to these statistics is restricted by a password held only by, e.g., the user's parent. Optionally, a detailed report is generated by the central computer and mailed to the parent, allowing the parent to carefully review his child's comparative scores. This report may also contain specialized exercises and remedial program recommendations based on the child's results.

In another embodiment, a class of students take computerized tests at home, each test being composed of different questions selected, in part, based on past performance. The questions can also be randomized, either in order or content, to deter cheating. Once finished, a student calls an 800 number to register his score code, which may include the serial number of the testing software and/or a student ID. Thus, one student cannot give his score code to a second student to falsely suggest that the second student had taken the test. To further deter fraud, the testing computers can be configured for simultaneous testing based on the receipt of a starting authorization.

As previously mentioned, the returned performance indication provides statistical information and/or future test customization to an end user, such as a parent or teacher. The same performance indication can also include a reward attainment message for certifying the user's achievement of a reward threshold, which had been previously registered by the parent, teacher, or other end user at the central computer. The end user can subsequently interrogate the testing computer (or even the central computer itself) to determine if the user had been issued the reward attainment message and to thereafter provide a reward in accordance therewith.

In the above embodiments, the testing software is located on the testing computer, and answers to pre-programmed questions are scored locally before the user manually transmits the score code to the central computer using a voice-based telephonic data input device. Alternatively, the testing computer connects to the central computer and transmits the score code via an on-line (e.g., Internet, World Wide Web, America Online, etc.) connection Indeed, the testing computer could even receive the test questions directly from the central computer rather than pre-storing them locally. This allows the test administrator great flexibility in modifying and controlling test question distribution and access. The order or content of subsequent test questions can also be interactively customized for the needs of the individual user in accordance with his ongoing or historical performance. Finally, instead of grading the test and transmitting the score code, the testing computer transmits ungraded test answers for grading and performance evaluation at the central computer.

Using this invention, remotely-located users can compare their results with other remotely located test-takers. Comparisons can be done on an ongoing basis with no need for an on-line connection, and scoring can be done locally with no need to send all answers to a centralized scoring authority. Alternatively, an on-line connection can be used for even greater flexibility in test question distribution and control.

Whether on-line or off-line, the user's score is securely associated with the user's identity, which deters cheating as well as allowing the test result to be certified to a party (e.g., a parent) that did not necessarily witness the test-taking. The parent does not need to monitor the test results because they cannot be falsely registered. The parent can even establish his own local criteria for evaluating his child's performance, with the monitoring and evaluation to be performed automatically by the same central computer that certifies the test results. The returned performance indication can also include commands to the testing software to customize future functionality based on past performance. In this sense, the educational software is not only for testing, but may also be used for tutoring or workbook purposes.

Similarly, teachers can obtain reports on how their students compare in a wide variety of dimensions versus other comparable students, and the students could therefore be provided with specific remedial direction. Also, because each student is uniquely associated with his test result, a teacher can administer a take-home test to a class of students without fear that the students may give each other a valid code to simulate having taken the test as a whole. Another type of cheating involves students receiving specific answers to specific questions from earlier test-takers during staggered testing in the absence of reliable monitoring. In that case, a central phone system (or other transmission system) would make available a "start code" only at a certain time (e.g., 8:00 PM) to students calling in for the code. Students would also have a specified window of time to call in and register their score codes at the end of the test. It is this simultaneity that deters students from calling earlier test-takers to receive the earlier test-taker's answers to the test questions.

Yet another form of cheating, that of test-taker substitution, is also deterred by the inclusion of corroborative data into the encoded score code transmitted from the testing computer to the central computer. Such corroborative data could include a biometric identifier of the user or of a witness to the testing (e.g., a proctor), other forms of witness identifiers entered via a keypad or other input device, or a location datum from a GPS receiver. In any of these cases, the corroborative data deters cheating by providing independent assurance that the test was taken by whom, where, or when it was supposed to have been taken.

The features and advantages of the present invention will be more readily understood and apparent from the following detailed description of the invention, which should be read in conjunction with the accompanying drawings, and from the claims which are appended at the end of the detailed description.

BRIEF DESCRIPTION OF THE DRAWINGS

FIGS. 11(a) and 11(b) illustrate exemplary content of (a) the score code and (b) the performance indication, respectively.

DETAILED DESCRIPTION OF THE INVENTION

Methods and apparatuses are disclosed for computer-based evaluation of a student's performance with respect to selected comparative norms. The system includes a home testing computer for transmitting the student's test results to a central computer which derives a performance assessment of the student. The performance assessment can be standardized or customized, as well as relative or absolute. Further, the transmitted test results are configured to reliably associate the student with his test results, using encoding and/or other user identification techniques, to deter fraud. Thus, for example, the system allows a parentally-controlled reward system such that a child who reaches specified objectives can claim an award that his parents are confident was fairly and honestly earned without his parents being required to supervise the child. Fraud, and the need for proctoring, is also deterred during multiple student testing via an option for "simultaneous testing" of geographically dispersed test-takers.

In this disclosure, certain ancillary elements used in conjunction with the educational testing device are well understood to those skilled in the art and are not shown in order not to obscure the present invention. For example, the design and construction of clocks, computer memories, and software or hardware cryptographic algorithms, are well-known to those skilled in the art and will not be described in detail herein.

Figure 1:
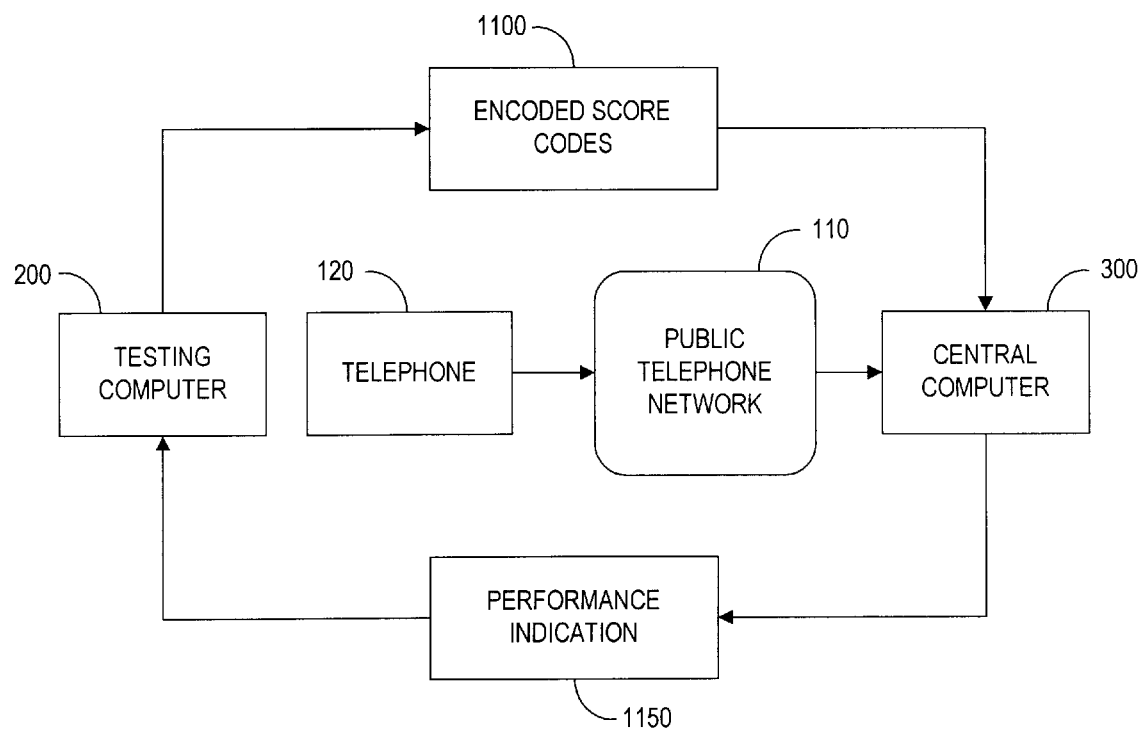
FIG. 1 illustrates the basic components of an embodiment of a system for computer-based educational testing.

Referring now to FIG. 1, there is shown a computer-based educational testing system comprising a testing computer 200 and a central computer 300. A test-taker at testing computer 200 typically exchanges information with the central computer 300 using a telephone 120 connected to a public telephone network 110 provided by a local or regional telephone operating company ("TELCO"). However, those skilled in the art will appreciate that dedicated data lines, cellular telephony, Personal Communication Systems ("PCS"), microwave links, satellite systems, or any other direct or indirect communication link could also be used. The educational testing system facilitates the administration of a test at testing device or testing computer 200, the sending of encoded score codes 1100 to the central computer 300, and the generation and transmission of a performance indication 1150 to an end user. The end user can be the test-taker himself, his parent, his teacher, college admissions office, or any other party having an interest in the performance of the test-taker. In the exemplary embodiment shown in FIG. 1, the performance indication 1150 is shown as being returned to an end user at telephone 120 for entry into the testing computer 200.

Figure 2:
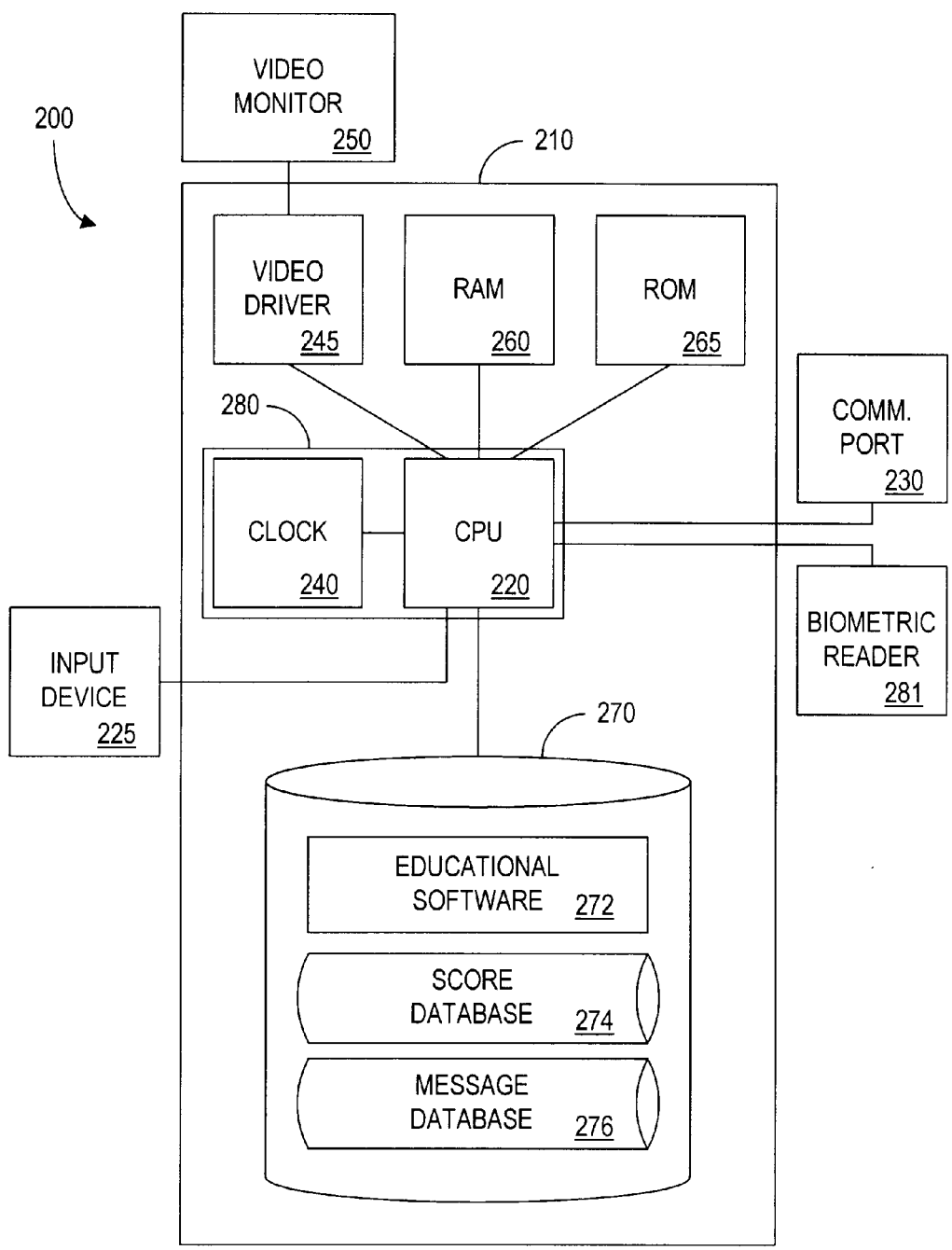
FIG. 2 illustrates an embodiment of a device for administering a test at a user's home.

As shown in FIG. 2, the testing computer 200 could be a conventional personal computer 210 having a Central Processing Unit ("CPU") 220, an input device 225 (e.g., a keyboard or mouse), one or more communications ports 230, a clock 240, a video driver 245, a display (e.g., a video monitor) 250, Random Access Memory ("RAM") 260, Read Only Memory ("ROM") 265, and a data storage device 270. The data storage device 270 could either be fixed media (e.g., a hard disk) or a drive capable of reading removable media (e.g., a floppy disk or CD-ROM). The data storage device 270 may be used to store educational software 272, a score database 274, and the message database 276. The score database 274 contains the performance indication 1150 received from the central computer 300. The message database 276 contains audit data produced by the educational software 272, or received from the central computer 300, such as a cumulative record of all tests taken by the test-taker.

For security purposes, one or more of the CPU 220, the clock 240, the RAM 260, the ROM 265, or the data storage device 270, can be located within a secure perimeter 280. Secure perimeter 280 may include physical, electronic, or a combination of physical and electronic features to resist tampering. For example, physical features could include encapsulation, electronic features could include a silicon firewall, and combination features could include self-zeroizing, or otherwise volatile, RAM 260 or ROM 265 which electrically modifies its contents upon detection of tampering. Such tampering might include physically stressing the device or attempting to change the clock rate by modifying its power source (not shown in the Figure) to operate outside an allowable voltage or frequency range. Alternatively, secure perimeter 280 could be merely tamper-evident. As will be appreciated by those skilled in the art, a great variety of tamper-resistant/tamper-evident techniques can be deployed, and will not be enumerated in detail herein. Therefore, as a matter of convenience, terms such as "tamper resistant," "tamper evident," or "secure" shall be understood to refer to any of the aforementioned or other security measures.

The testing computer 200 may optionally be connected, via communications port 230, to a communication device (e.g., a modem, a network card, or a transmitter) to allow direct communications with the central computer 300. Finally, for security purposes to be described later, the testing device 200 may also include a biometric reader 281 such as fingerprint reader or retinal scanner.

Figure 3:
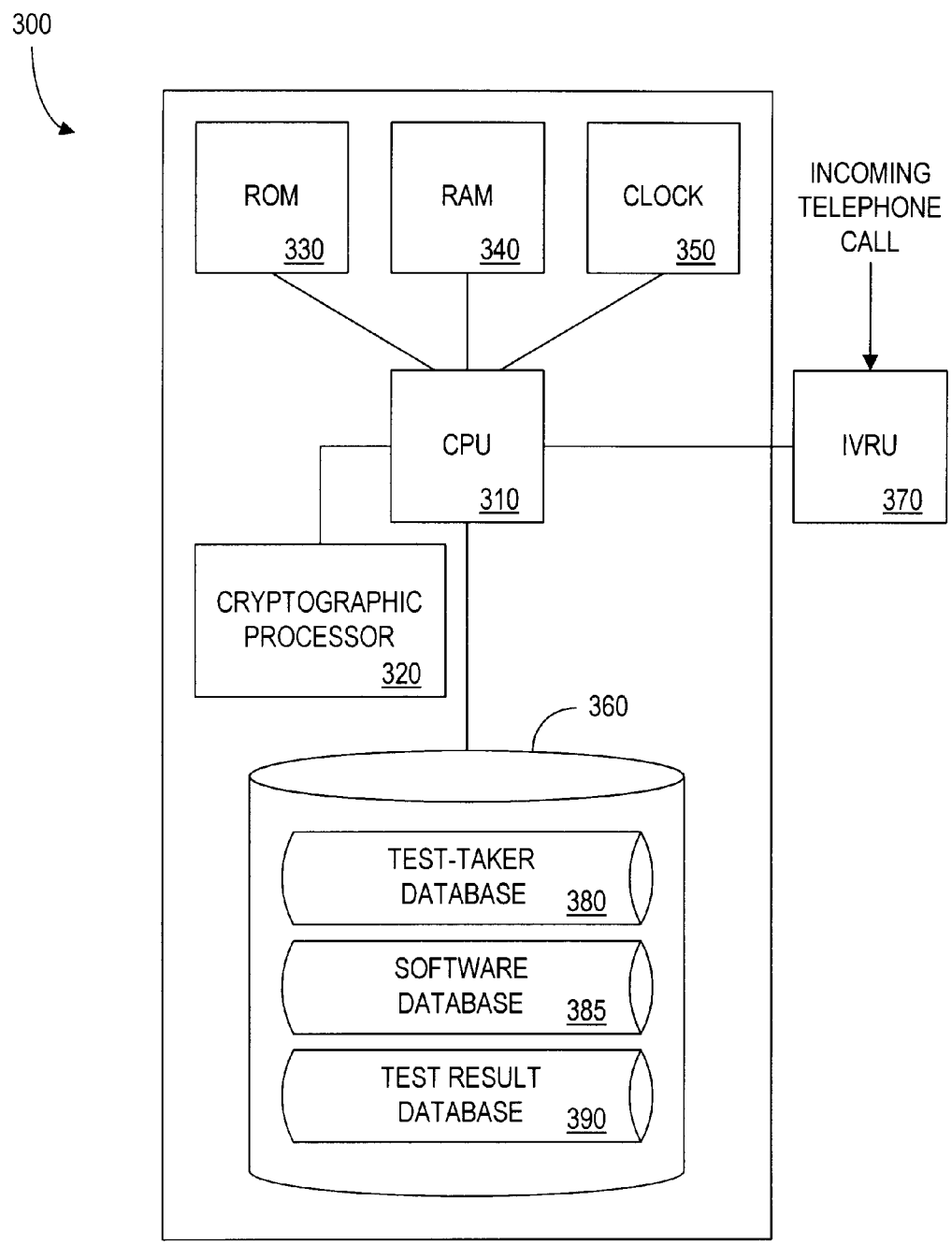
FIG. 3 illustrates an embodiment of a central computer configured for receiving a score code from a testing device, performing a comparative evaluation of a test result with selected norms, and returning a performance indication to the user.

As shown in FIG. 3, the central computer 300 includes a CPU 310, cryptographic processor 320, ROM 330, RAM 340, clock 350, and data storage device 360. As illustrated, the cryptographic processor 320 might be a specially secured, dedicated processor separate from the CPU 310. Alternatively, the cryptographic processor 320 could be integrated in the CPU 310. Thus, any conventional personal computer, computer workstation, or mainframe computer having sufficient memory and processing capabilities may be used as the central computer 300.

In one embodiment of the invention, the central computer 300 is connected to an interactive voice response unit ("IVRU") 370 for receiving score codes 1100 (see FIGS. 1 and 11($a$)) from the test-taker via touch-tone signals transmitted over public telephone network 110. This process will be described in greater detail below with respect to FIG. 6. IVRUs are well known in the art (see, e.g., Jerry Fitzgerald, "Business Data Communications—Basic Concepts, Security & Design," 4th ed., John Wiley & Sons, 1993) and need not be described in detail here.

The central computer 300 receives the encoded score code from the test-taker, decodes it using CPU 310 and/or cryptographic processor 320, and compares the decoded test result against test benchmarks stored in software database 385 or test result database 390. The central computer 300 then generates a performance indication 1150 (see FIG. 11) containing its evaluation and returns the performance indication 1150 to the end user. Because the central computer 300 might be simultaneously performing these operations for a multitude of test-takers, it must be capable of high-volume transaction processing and of performing a significant number of mathematical calculations in processing data inquiries. Thus a relatively powerful microprocessor that has a wide data bus would be a suitable CPU 310. Typical of such processors are the Intel Pentium or the Motorola PowerPC 604, which both employ a 32-bit bus.

The cryptographic processor 320 supports verification of the encoded score code 1100 received by the central computer 300, as well as encoding of the performance indication 1150, subsequently returned to the end user. Any suitable microprocessor may be used for the cryptographic processor 320. For example, in its 16 MHz configuration, the Motorola MC68HC16's fast 16-bit multiply-and-accumulate instruction requires less than one second to perform a 512-bit RSA private key operation. Other commercially available specialized cryptographic processors include VLSI Technology's 33 MHz 6868 or Semaphore Communications' 40 MHz Roadrunner284. As stated above, the cryptographic processor 320 may also be configured as part of CPU 310.

Data storage device 360 reads either fixed storage media within the central computer 300, or removable storage media external to the central computer 300. Such media could include high capacity magnetic (e.g., hard disk), optical (e.g., CD-ROM), or magneto-optical media, as well as low capacity media such as flash memory. Stored on these media are test-taker database 380 and test result database 390. Test-taker database 380 maintains data on the test-taker and/or end user, including names, personal ID numbers, phone numbers, private key information, e-mail addresses, physical addresses, software owned, etc. Test result database 390 maintains data on all score codes sent to the central computer 300. The score codes will be discussed in greater detail below with respect to FIG. 11($a$), but might include various ID numbers (e.g., test-taker, testing device and testing software), and an indication of answers to the test questions (e.g., questions answered correctly/incorrectly, or slowest/fastest).

Figure 4:
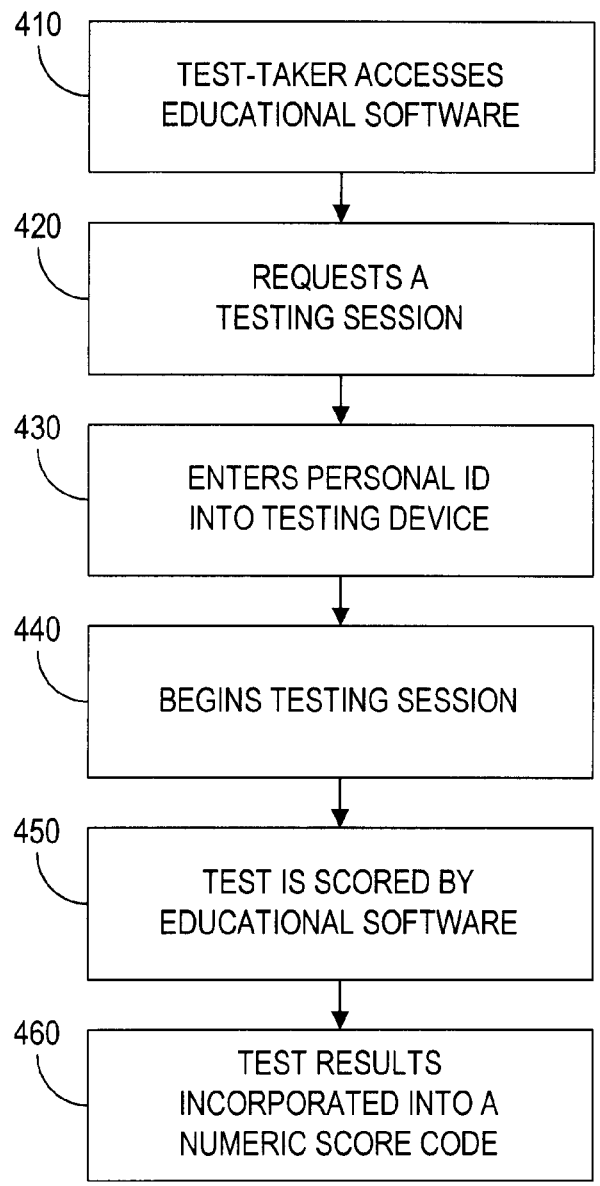
FIG. 4 illustrates an exemplary test administration procedure.

Referring now to FIG. 4, there is shown an exemplary embodiment of a process for administering a test. As a matter of convenience, the elements of the system will be referenced as numbered in FIGS. 1–3, although such numbering is not shown in the process description of FIG. 4. At step 410, the test-taker sits down at the testing computer 200 and, at step 420, requests a testing session from the educational software 272. The educational software 272 is loaded into the RAM 260 of the testing device 200 to be executed by its CPU 220. At step 430, the educational software 272 instructions appear on the video monitor 250 requesting that the test-taker enter his personal ID number into the testing device 200 for identification.

At step 440, the testing process begins, with test questions being displayed on the video monitor 250. The test-taker supplies answers through the keyboard or mouse 225, and continues until the testing process is complete. Questions can include true/false, multiple choice, fill-in-the-blank, or any other machine-scorable format.

At step 450, the educational software 272 scores the test by comparing the answers provided by the test-taker to the correct answers stored within the educational software 272. At step 460, the test results are incorporated into a numeric score code, which includes not only the number of correct/incorrect answers, but also an indication of which answers were incorrect. In a twenty-question geography test, for example, the score code might indicate that three answers were wrong, and that questions number six, twelve, and seventeen were missed. As shown in FIG. 11(a), the score code 1100 might also include data on the amount of time required to answer each question, as well as identifying information as to the testing computer 200, educational software 272, and test-taker.

Figure 5:
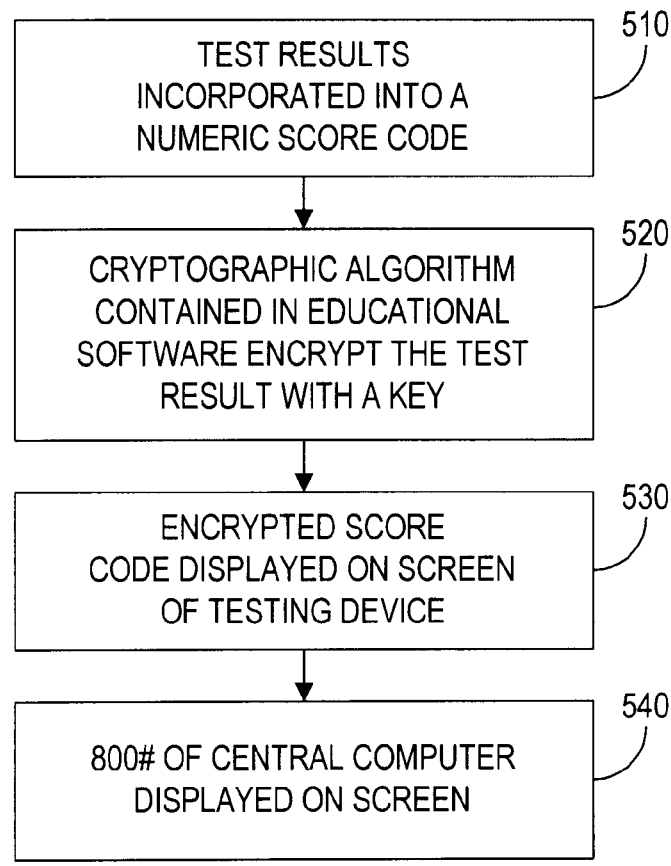
FIG. 5 illustrates an exemplary score code encoding procedure.

FIG. 5 illustrates an exemplary embodiment of a process for encoding the test results at the home testing computer 200. The process begins, at step 510 (same as step 460 of FIG. 4), with incorporating the test results into a numeric score code 1100. At a minimum, to prevent fraud by a dishonest test-taker, the test results should be encoded using a secret algorithm (e.g., scrambling or digit replacement techniques), known only to the testing computer 200 and the central computer 300. Stronger forms of encoding, which use cryptographic protocols, could also be used to encode the test results. Thus, at step 520, a suitable cryptographic algorithm contained in the educational software 272 is used for encoding the test result. For example, if the cryptographic operation constitutes encryption, RSA could be used for public key (asymmetric) encryption. The keys could be arbitrary, or they could be based on the testing computer ID number or test-taker's personal ID number. While encryption in the testing computer's private key is particularly appropriate if authenticity is required, encryption in the central computer's public key is appropriate if confidentiality is desired. If both authenticity and confidentiality are desired, a double encryption could use both the testing computer's private key and the central computer's public key. Furthermore, secret key (e.g., DES) encryption could be used if the stronger protections of public key cryptography are not required or if public key cryptography is too computationally intensive. Finally, although asymmetric or symmetric cryptographic techniques are described herein, those skilled in the art will appreciate that many other cryptographic techniques can also be used, as will be described below in the section entitled "Alternative Embodiments of the Invention." These encoding protocols can be implemented in software or hardware, and can be made more secure by including the algorithm and keys in secure perimeter 280. Continuing now with FIG. 5, the encrypted score code 1100 is displayed on the monitor 250 of the testing computer 200, at step 530, along with an 800 number to call, at step 540.

Figure 6:
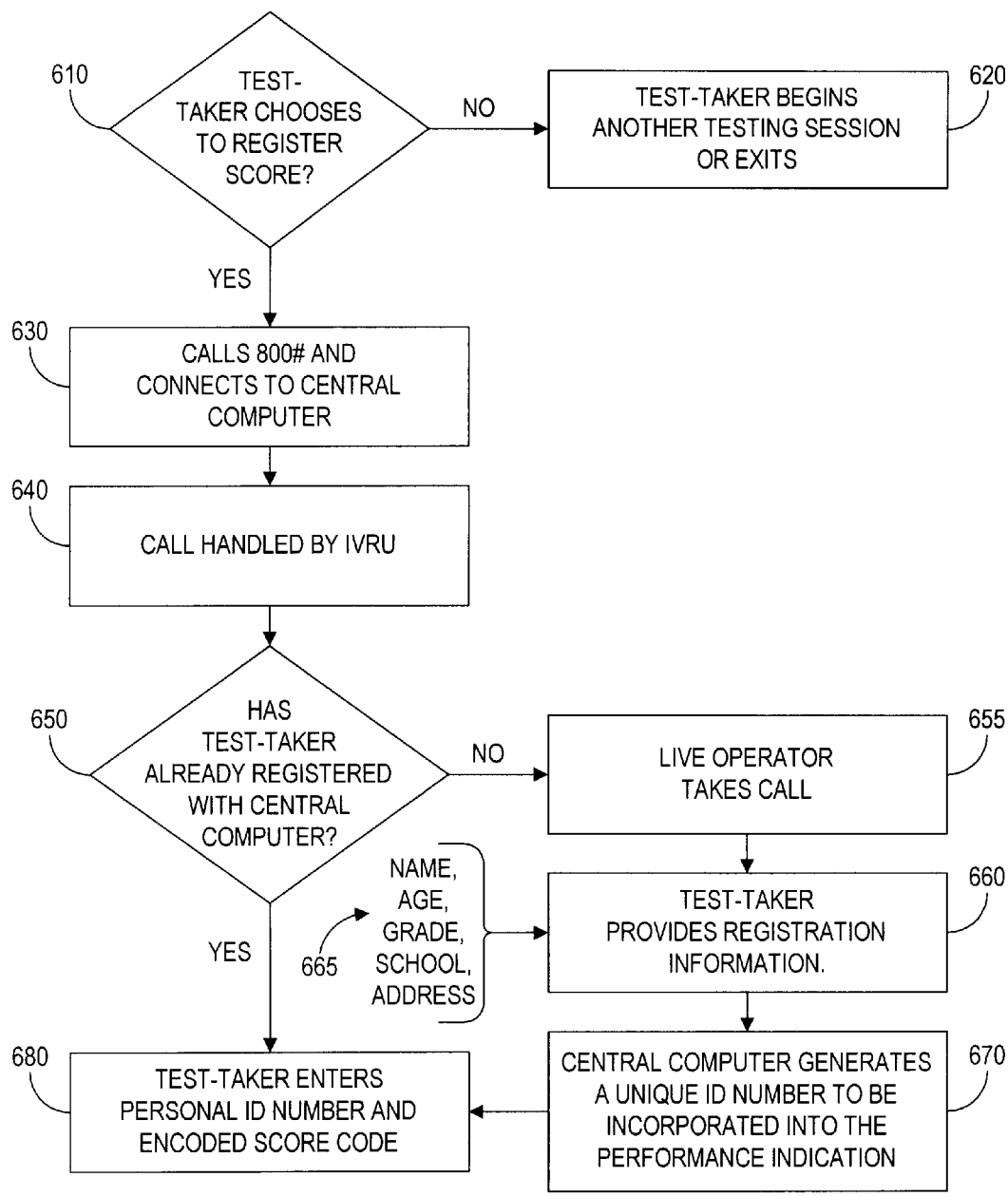
FIG. 6 illustrates an exemplary score code transmission procedure.

Referring now to FIG. 6, there is shown an exemplary embodiment of a process for transmitting the encoded score code 1100 to the central computer 300. At step 610, at the conclusion of the testing session, the test-taker may be given an option whether or not to register his test result. If he believes that he has performed poorly, he may decide not to register. The test results could be displayed on the video monitor 250 only in encoded form, which would be unintelligible to the test-taker. Thus, a good result would be indistinguishable from a bad result because neither would appear in plaintext form. This would help discourage fraud in the form of continuous retaking of a test until a good result was achieved. If the test-taker decides not to register, at step 620, he begins another testing session or exits from the educational software 272. If the test-taker decides to register, at step 630, he calls the 800 number displayed on the monitor 250 and connects to the central computer 300. In step 640, the IVRU 370 of the central computer 300 handles the call.

At step 650, if the test-taker has previously registered himself with the central computer 300, he continues with score code transmission at step 680. Alternatively, if the test-taker has not yet registered himself with the central computer 300, the call is transferred at step 655 to a live operator to whom the test-taker provides registration information in step 660. As shown in block 665, such information might include the test-taker's name, phone number, address, age, school, grade level, end user to receive the performance indication (e.g., a parent or the test-taker himself), educational software ownership, etc. At step 670, a unique personal ID number is then assigned to the test-taker. The central computer 300 creates a database record for this information in the test-taker database 380, which is indexed by personal ID number. The test-taker is then fully registered with the central computer 300 and is ready to transmit the encoded score code 1100.

At step 680, the testing computer 200 displays the encoded score code 1100 to the test-taker, who subsequently manually telephones the central computer 300 and uses his touch-tone keypad to transmit his personal ID number and the encoded score code 1100 to the central computer 300 in response to voice prompts from the IVRU 370.

Figure 7:
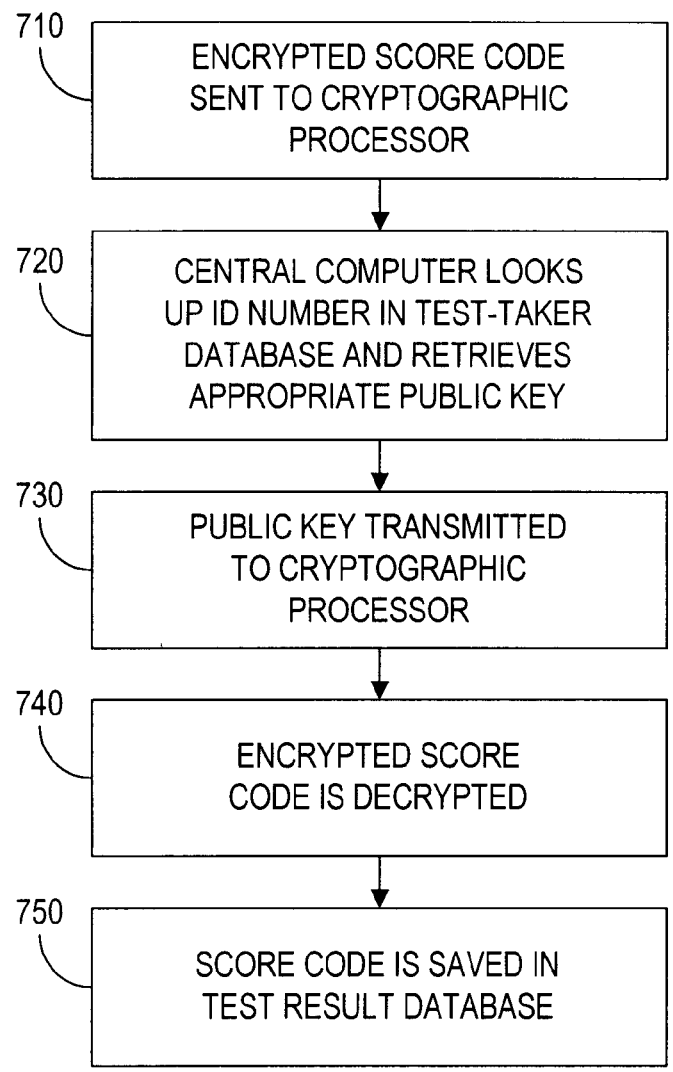
FIG. 7 illustrates an exemplary decoding procedure at the central computer.

Referring now to FIG. 7, there is shown an exemplary embodiment of a process for decoding the encoded score code 1100 at the central computer 300. At step 710, the encoded score code 1100 is sent to the cryptographic processor 320. At step 720, the central computer 300 looks up the personal ID number in the test-taker database 380 and retrieves the appropriate key to decrypt the encoded score code 100. If asymmetric cryptography is used, this would be the public key corresponding to the test-taker's private key; if symmetric cryptography is used, this would be the same secret key used for the encryption at the testing computer 200. At step 730, the public key is transmitted to the cryptographic processor 320.

Upon receipt of the decryption key, the cryptographic processor 320 decrypts the encrypted score code 1100 at step 740, thereby verifying that the score code was produced by the personal ID provided therein. The decrypted score information is then stored within test result database 390 at step 750.

Figure 8:
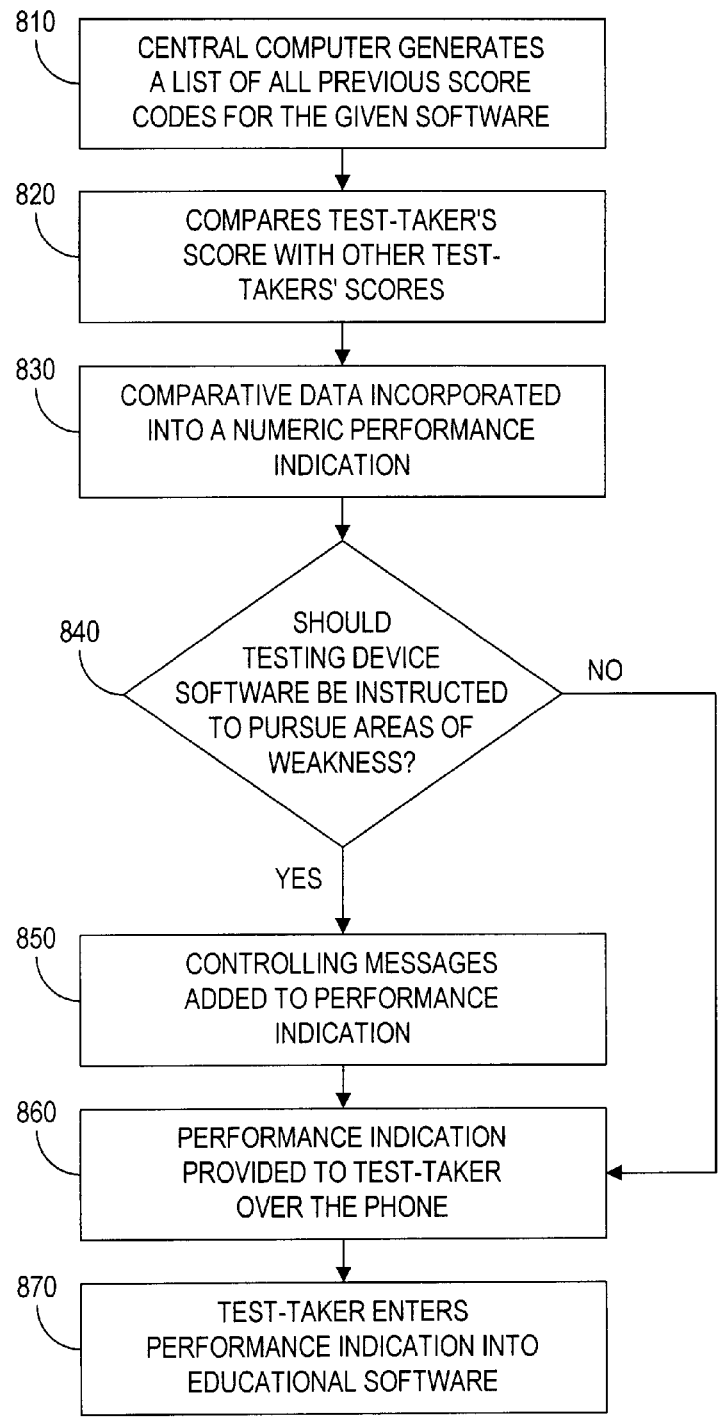
FIG. 8 illustrates an exemplary performance assessment procedure.

Referring now to FIG. 8, there is shown an exemplary embodiment of a process for evaluating the decoded score code at the central computer 300. At step 810, the central computer 300 takes the score code and initiates a search for comparative scores. Within the numeric code of the score code is the software ID number, identifying the software used for that test session. To find other test results for this software, the central computer 300 sorts the test result database 390 by software ID number, retrieving only those records that pertain to the educational software 272. These records could be further narrowed, for example, by restricting them to those records generated by test-takers of the same age or grade level.

In step 820, the test-taker's test result is then compared relative to the scores of an appropriate reference group of other test-takers, or some other test benchmark, to generate a simple statistical comparison such as percentile rank. At step 830, these comparative data are incorporated into a numeric performance indication 1150, which will be given to the test-taker for input into the educational software 272 that generated the test result (see FIG. 1).

If the test result indicates a particular area of weakness, the central computer 300 can generate a control message that directs the testing computer's educational software 272 to focus on that particular weakness during subsequent testing sessions by modifying the testing computer's operation in response to the control message in step 840. For example, if the test-taker is consistently missing fractions questions during math tests, the testing computer 200 could be directed to tutor the test-taker in that subject or ask more questions of that type on the next math test. Each software package could have hundreds of methods to focus future tests, each method tied to a control message stored in a software database 385 of the central computer 300 and in message database 276 of testing computer 200. In the above example, focusing on fractions might be expressed as control message "324" of the software database record for the math software. As shown in step 850, such control messages are included along with the evaluative data in the performance indication 1150 before it is provided to the test-taker (or other end user) over the phone in step 860.

The test-taker enters the performance indication 1150 into the educational software 272 that generated the test result in step 870, thereby triggering the educational software 272 to display the evaluative data generated by the central computer 300. The performance indication 1150 could use cryptographic techniques, similar to those used for the test results, to ensure authenticity and/or integrity.

Figure 9A:
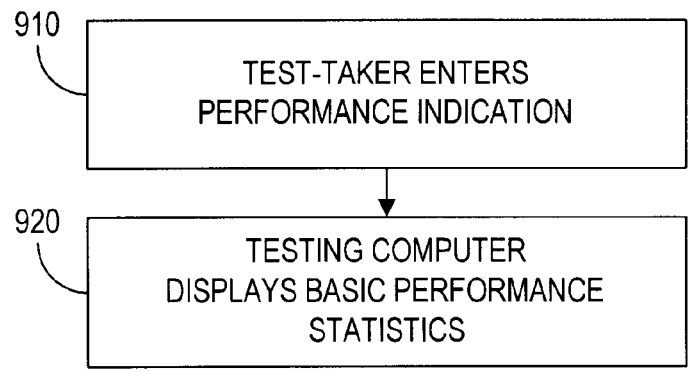
FIGS. 9(a) and 9(b) illustrate exemplary procedures for providing the performance indication to the user.

Referring now to FIG. 9(a), there is shown an exemplary embodiment of a process for providing the performance indication 1150 to the test-taker. At step 910, the test-taker enters the performance indication 1150 into the testing computer 200, which verifies the performance indication 1150 to ensure that it is valid. Then, at step 920, the testing computer 200 displays basic statistics as to the relative performance of the test-taker. The amount of information contained within the performance indication is limited by its transmission between the test-taker (or his parent) and the central computer 300 in audio form over the telephone 120 of FIG. 1, including such factors as the amount of data the test-taker is willing to enter or the rate at which the test-taker can listen to and enter the data.

Figure 9B:
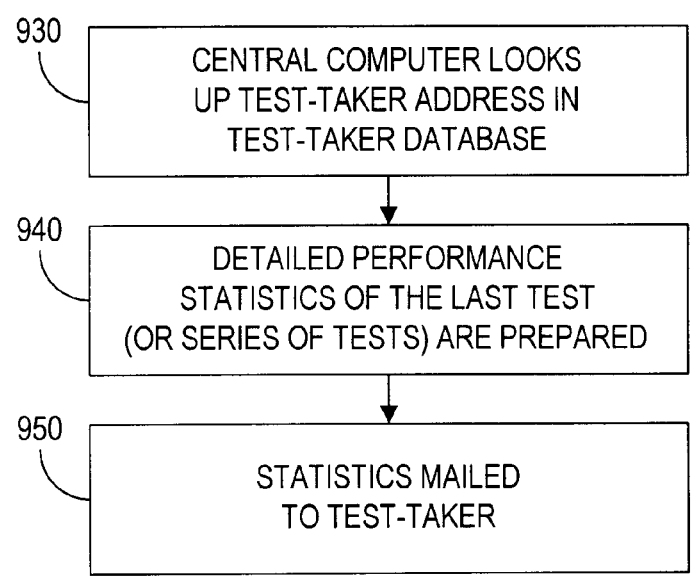

Those skilled in the art will appreciate that other transmission methods, such as the use of DTMF or other modulated tones, can significantly increase the amount of information transferred without requiring the test-taker to manually enter the data. In that case an acoustic coupler/demodulator associated with the testing computer 200 would convert the audio DTMF tones into a digital bitstream without any human intervention. Of course, such modulated tones could also be used for the initial transmission of the encoded score code 1100 from the testing computer 200 to the central computer 300. Alternatively or additionally, the central computer 300 could also generate a detailed comparison report to be mailed to an end user (perhaps the test-taker himself), as shown in FIG. 9(b). The test-taker would make such a request via, or during transmission of, the encoded score code 1100 sent to the central computer 300 using the IVRU 370. These more detailed score codes could indicate how well the test-taker has performed based on his total score, and/or individual questions, based on an appropriate geographic or demographic test benchmark. In step 930, the central computer 300 looks up the test-takers address in the test-taker database 380. Detailed performance statistics of the last test (or series of tests) are prepared in step 940 and mailed to the test-taker at his address in step 950.

It was mentioned previously that the performance indication 1150 may be provided to the test-taker for input into the testing computer 200. Alternatively, the performance indication 1150 may be provided to an end user other than the test-taker himself. Either way, the performance indication 1150 represents a certification of the test result, by the central computer 300, to an end user monitoring the test-taker's performance. Thus, the performance indication 1150 may incorporate a reward attainment message, specifying the test-taker's achievement of a specified performance level, that can be subsequently accessed by the end user at some time after the testing session.

Figure 10:
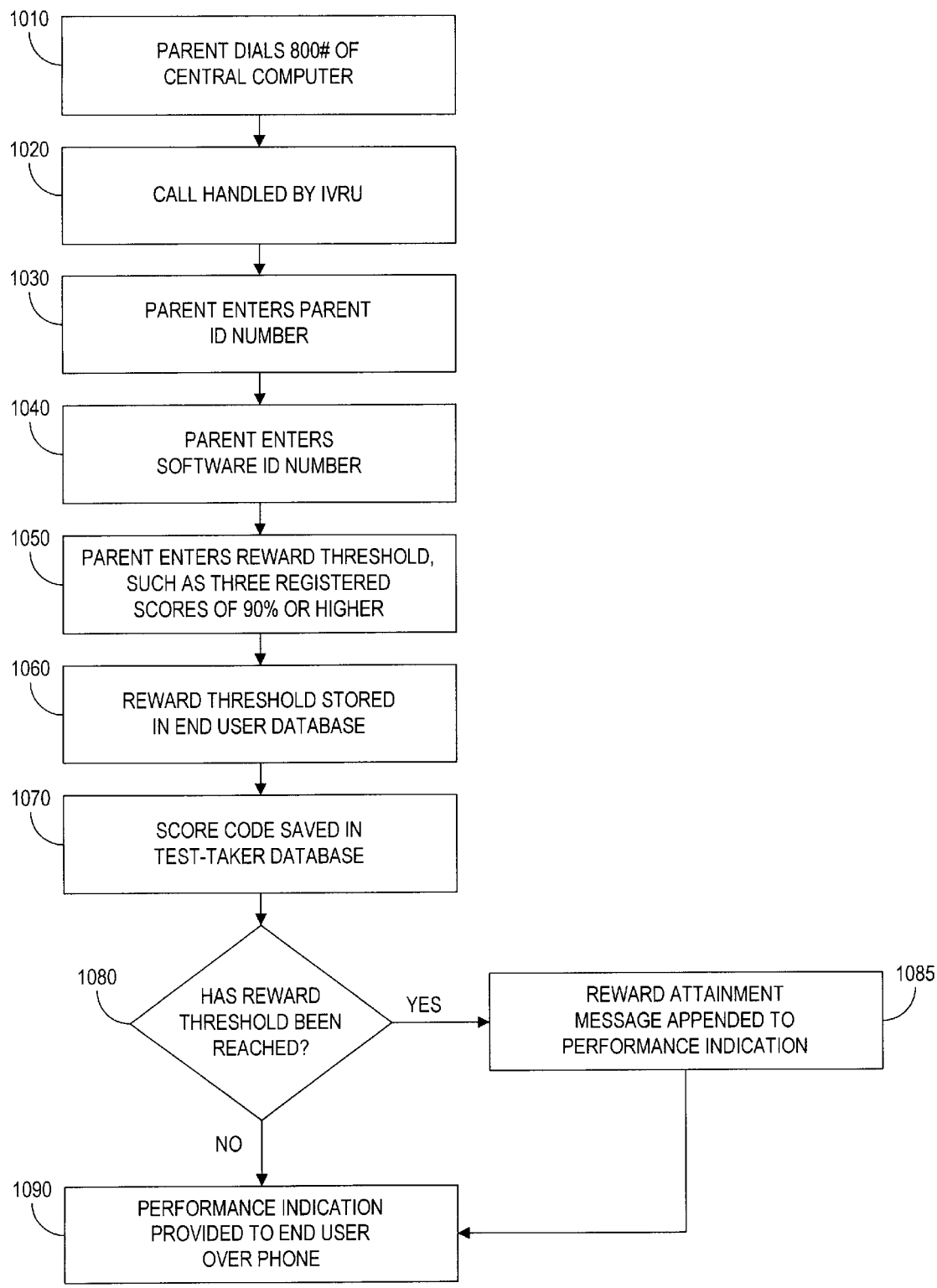
FIG. 10 illustrates an exemplary reward system.

Referring now to FIG. 10, there is shown an exemplary embodiment of a process for an end user to administer a reward system based on the performance indication 1150. The reward system consists of two stages: specifying a reward level (in steps 1010–1060) and checking the child's performance (in steps 1070–1090). At step 1010, the test-taker's parent (or teacher) calls the central computer 300 using a telephone in a manner similar to the test-taker's test result registration process by dialing an 800 number associated with the central computer 300. During initialization, the parent is prompted (at step 1020) by the central computer's IVRU 370 to enter his parent ID number (at step 1030), the software ID number (at step 1040), and a reward threshold to be monitored by the central computer 300 (at step 1050). The reward threshold could be in addition to, or part of, the test benchmark described previously in the content of test result evaluation.

The reward threshold is stored in an end user database (not shown) of the data storage device 360 in step 1060. During a subsequent testing session, the central computer 300 saves the score code in the test-taker database and at step 1070 checks the score code against the specified reward threshold in step 1080. If appropriate, at step 1085, a reward attainment message is included in the performance indication 1150 provided by the IVRU 370 to the test-taker over the phone. The test-taker then enters the performance indication 1150 into the testing computer 200 where it can be accessed at a later time by the test-taker's parent. Alternatively, the parent can himself call the central computer 300 to directly receive the performance indication 1150 including the reward attainment message in step 1090. The parent could then use the reward attainment message to provide a designated reward to the test-taker.

Alternative Embodiments of the Invention

(1) Cryptographic Techniques

As previuosly described, encryption is the encoding protocol used for certifying the test results. Provided the encryption key has not been compromised, if the central computer 300 can decrypt the encrypted score code 1100, it is known to be authentic. Alternatively, the cryptographic technique of "one-way functions" may be used to ensure test result integrity. As used herein, a one-way function is one that outputs a unique representation of an input such that a given output is likely only to have come from its corresponding input, and such that the input can not be readily deduced from the output. Thus, the term one-way function includes hashes, message authenticity codes (MACs—keyed one-way functions), cyclic redundancy checks (CRCs), and other techniques well known to those skilled in the art. See, for example, Bruce Schneier, "Applied Cryptography," Wiley, 1996. As a matter of convenience, the term "hash" will be understood to represent any of the aforementioned or other one-way functions throughout this discussion.

Figure 12:
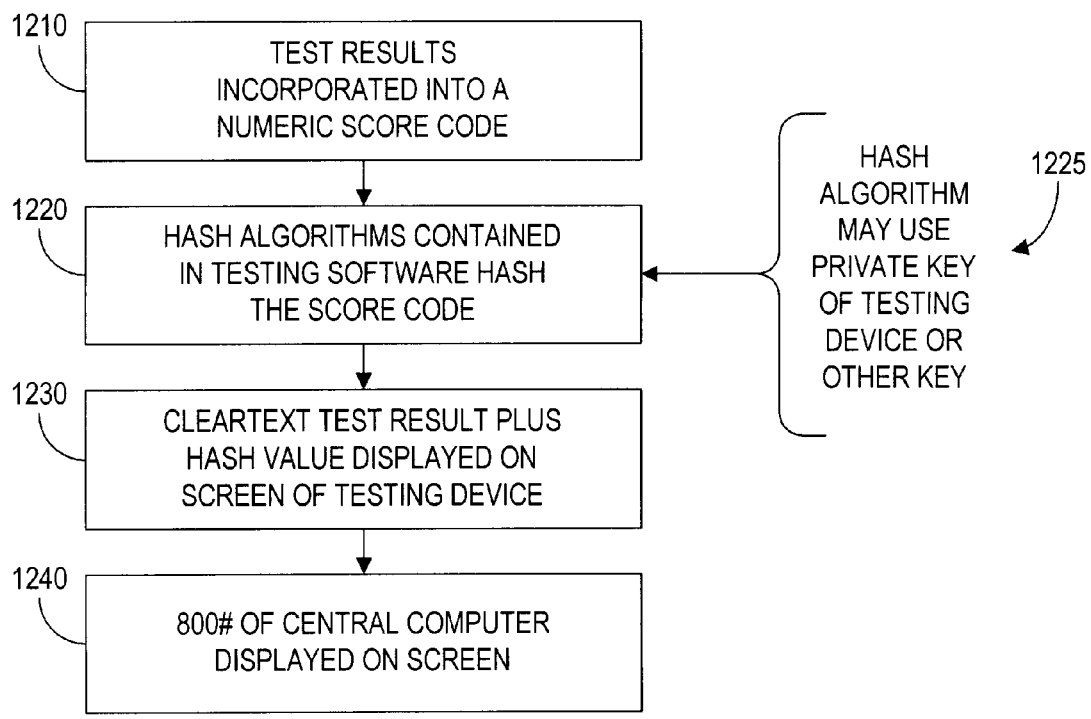
FIG. 12 illustrates an alternative embodiment of the invention wherein the score codes are encoded using a cryptographic hashing operation.

Referring now to FIG. 12, there is shown an exemplary embodiment of a process for encoding test results at the testing computer 200 using hash functions. The process begins, at step 1210 (the same as step 510 of FIG. 5) with the testing computer 200 incorporating the test results into a numeric score code 1100. As shown in step 1220, CPU 220 then uses a software hashing algorithm incorporated in educational software 272 to hash the score code 1100. Alternatively, the hashing algorithm could be stored in RAM 260 or ROM 265, or it could be hardwired in a special dedicated cryptoprocessor (e.g., a test-taker's cryptographic token) separate from the CPU 220. As shown in step 1225, the hash algorithm may use the private key of the testing device 200 or any other key. The result is an encoded score code 1100 comprising the (cleartext) test result and a (ciphertext) one-way function representative of at least a portion of the test result. This encoded score code 1100 is displayed on video monitor 250, at step 1230, along with an 800 number for the test-taker to call to register the hash, at step 1240. Notice that, in contrast to the encryption embodiment in which the test result could be displayed only in encoded form, the hashed test result must also be made available to the central computer 300 in cleartext form.

If it is desired to prevent the test-taker from seeing his actual test result (e.g., to prevent multiple test-taking as described previously), the hashing can be performed in conjunction with encryption. For example, the test can be first encrypted prior to hashing.

Alternatively, the test result can first be hashed and then encrypted. The use of hashing followed by encryption is often referred to as a digital signature. The encryption operation ensures test result authenticity, in addition to the test result integrity provided by the hashing operation. Finally, instead of or in addition to encryption, a unique device identification number (see FIG. 11(*a*)) can be added to the encoded test result 1100 to provide assurance of authenticity.

Figure 13:
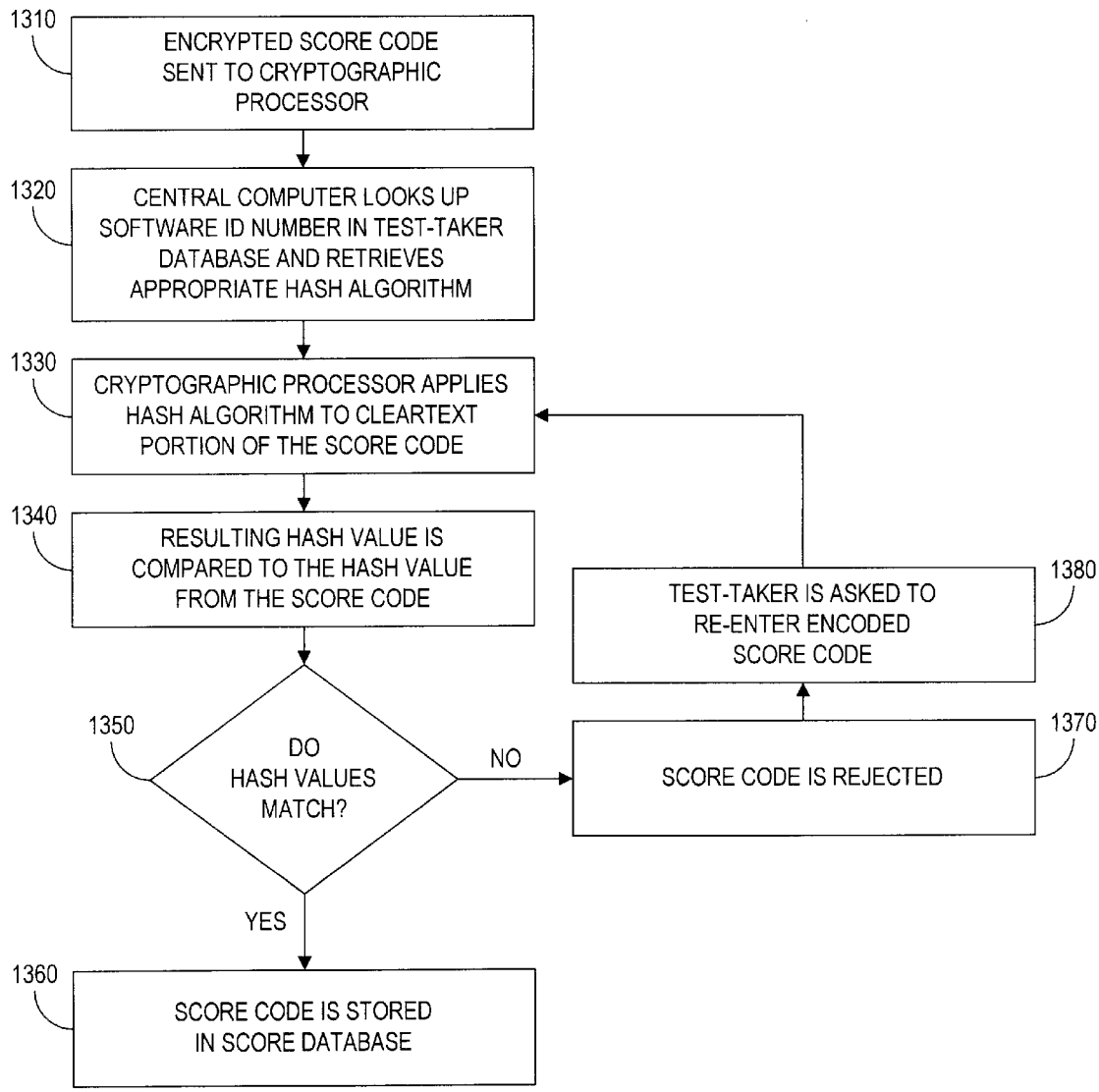
FIG. 13 illustrates an exemplary process for decoding the encoded score code corresponding to FIG. 12.

Referring now to FIG. 13, there is shown an exemplary embodiment of a decoding process corresponding to FIG. 12. At step 1310, the encrypted score code 1100 is sent to the cryptographic processor 320 of central computer 300, which verifies the hashed test result by reading the cleartext part of the encoded score code (e.g., the test result and testing device 200 or software ID) and the ciphertext part of the encoded score code (e.g., a hash of a portion of the cleartext part). At step 1320, the central computer 300 looks up the software ID number in the test-taker database 380 and retrieves the appropriate hash algorithm. In step 1330, the cryptographic processor 320 applies the hash algorithm to the appropriate portion of cleartext part of the score code 1100 to recompute the hash. If the encoded score code uses any form of encryption in addition to hashing, the central computer 300 would locate and perform the appropriate cryptographic protocol to decrypt the encrypted portion of the score code in the appropriate manner.

At steps 1340 and 1350, the received and recomputed hashes are compared to determine that the score code came from the testing computer 200 and had not been altered subsequent to transmission. If so, at step 1360, the score code is stored in score code database 274. If not, the score code is rejected at step 1370, and the test-taker is asked to re-enter the encoded score code at step 1380.

Certain well-known enhancements to public key cryptography could also be used to provide greater assurance. For example, the encoded score code could include digital certificates for public key distribution to a central computer 300 that does not know the testing computer's public key needed to verify a score code encrypted with the testing computer's private key. In a digital certificate, the testing computer's public key is encrypted (and vouched for) by the private key of a trusted certifier (e.g., a well-known manufacturer of the measurement certification device) whose public key is known to the central computer 300. The central computer 300 uses the certifier's public key to decrypt the testing computer's public key, then uses the testing computer's public key to decrypt the encrypted score code.

Alternatively, the central computer 300 could simply obtain the testing computer's public key from a publicly accessible database, eliminating the need for digital certificates.

Another commonly used cryptographic technique, the so-called challenge-response protocol (CRP), may be used to ensure to a recipient that an encoded score code 1100 is current, i.e., not a copy of a previously generated encoded score code. During test result registration, the central computer 300 generates and transmits a random number datum (also referred to as a "nonce") to the testing computer 200. The testing computer 200 then incorporates the random number in the encoded score code 1100 transmitted to the central computer 300. If the received random number matches the random number previously generated, the central computer 300 accepts the encoded score code 1100 as fresh. Conversely, an old encoded score code 1100 would contain a non-matching random number. Those skilled in the art will appreciate that the challenge can use any datum whose value is unpredictable by the testing computer 200; random numbers happen to be a particularly convenient choice.

Although public key and symmetric key cryptography have been described in the encryption of the score code, those skilled in the art will realize that simpler cryptographic protocols may also be used. For example, substitution ciphers or transposition ciphers offer lower levels of security, but require far less computing power and can be more easily integrated into a software package.

In another variation, the testing computer 200 includes a sequence number in the encoded score code 1100. This sequence number is incremented by one every time the testing computer 200 generates an encoded score code 1100. The central computer 300 stores the most recent sequence number in memory, and accepts a transmitted encoded score code 1100 if its sequence number is one greater than the last stored sequence number.

In yet another variation, the testing computer 200 includes the current time in the encoded score code 1100 transmitted to the central computer 300. The central computer 300 then checks the time included in the encoded score code 1100 against the time from the central computer's clock 350. If the times are within a prescribed window, the encoded score code 1100 is accepted as fresh.

In still another procedure, the testing computer 200 itself generates a random number to be included in the encoded score code 1100. The central computer 300 maintains a database of all random numbers received from all testing computers. If the new random number is not in that database, then the current encoded score code 1100 is accepted as fresh. If a time element is incorporated as well, then the central computer 300 only has to store a relatively small quantity of received random numbers.

In any of the above variations, reused encoded score codes are prevented (or at least detectable) because a reused encoded score code 1100 would contain a datum corresponding to a previous request/reply pair, rather than the current datum.

Although certain exemplary cryptographic operations (hashing, asymmetric encryption, symmetric encryption, substitution ciphers, transposition ciphers, digital certificates, and challenge-response protocols) have been disclosed for use singly or in specified combinations, those skilled in the art will appreciate that many other combinations of these basic operations may be used, depending on the needs of the specific application.

(2) Corroborative Data for Test-taker Verification

The above-described cryptographic protocols are useful for deterring fraud in the form of score code modification. Alternatively, or in addition, corroborative techniques can be used for deterring fraud in the form of test-taker substitution. Biometric identification devices (e.g., a fingerprint reader, a voice recognition system, or a retinal scanner) may be used to provide absolute test-taker identity verification at the testing computer 200. An example of a fingerprint reader is the Startek FC100 FINGERPRINT VERIFIER, which connects to a PC via a standard interface card. The fingerprint verifier acquires a test-taker's fingerprint when the test-taker places his finger on an optical scanning lens, then scans, digitizes, and compresses the data (typically a 256 byte file) in memory. During testing, each live scan fingerprint is compared against a previously enrolled/stored template, stored in the testing computer 200. If the prints do not match, access to the educational software 272 can be denied. This procedure may be implemented: 1) before the start of a testing session, 2) during the testing session in response to prompts from the educational software, 3) at some predetermined or random time, or 4) continuously by incorporating the scanning lens into the testing computer 200 such that the test-taker is required to maintain his finger on the lens at all times during the testing session for continuous verification.

As another example of a biometric device, a voice verification system, located at either or both the central computer 300 and the testing computer 200, may utilize a person's "voice-print" to verify test-taker identity. The process of obtaining a voice-print and subsequently using it to verify a person's identity is well-known in the art, and will not be described in detail herein. Those of ordinary skill in the art will appreciate that suitable voice identification/verification technologies are commercially available from companies such as SpeakEZ, Inc. and others.

During initialization, the speaker identification software is used to sample the test-taker's voice, which is stored in the test taker database 380 at the central computer 300. Each time the test-taker calls the central computer 300 to register a test result, the IVRU 370 prompts the test-taker to speak his or her name into the telephone 120. The speaker identification software then directs the central computer 300 to check the test-taker's current voice-print against the voice-print stored in the test taker database 380. Unless there is a match, the test result registration procedure is aborted. The voice-print may also be stored in a database in the testing computer 200, to verify the test-taker's identity at that location prior to allowing a test session.

The above-mentioned biometric data are useful for corroborating the test-taker's identity. In addition, other forms of independent data can be added to the encoded score code 1100 to corroborate the testing process. For example, the biometric reader could be used to certify the identity of a witness to the testing process (e.g., a proctor) in addition to the identity of the test-taker himself. Of course, the witness could also be certified by inputting a unique witness identifier into a keypad or other input device at the testing computer 200. Alternatively, a Global Positioning Satellite (GPS) signal receiver could be incorporated with the testing computer 200 to provide a corroborative datum indicating the location of the testing computer.

(3) Direct Communication between Testing and Central Computers

The above embodiments have been described with respect to a system utilizing an indirect connection between the testing computer 200 and the central computer 300, i.e., the test-taker himself acts as an information conduit between the testing computer 200 and the central computer 300, in conjunction with telephone 120 and IVRU 370. As discussed above with respect to the delivery of the performance indication to the test-taker, this may limit the amount of information that can be conveyed between the testing computer 200 and the central computer 300. One solution, when response time is not crucial, involves transmitting such information via non-electronic media (e.g., FIG. 9(b)). Another solution would be to establish a direct electronic connection via a dial-up modem, a cable modem, a set-top box, or any other form of electronic communication. For example, conventional modems may be used for communications at rates from 1,200 to 33,000 bits per second (baud). Alternatively, ISDN modems may be used for communications at rates of 64,000 to 128,000 baud. Finally, special network switches may be used in connection with even higher-speed communications links, e.g., over T1 or T3 lines. Such a connection would allow the transmission of vastly greater amounts of information, as well as allowing the testing computer 200 to take advantage of the storage and processing capabilities of the central computer 300.

The central computer's network interface must also be able to support multiple, simultaneous data connections. In a preferred embodiment, the central computer 300 is accessible over the INTERNET or commercial on-line services such as America Online, CompuServe, or Prodigy, allowing multiple test-takers to access the central computer 300 via simultaneous on-line connections.

In another embodiment of the invention, the test questions would not have to be pre-stored at the testing computer 200, but could be stored at, and downloaded directly from, the central computer 300. This would give the testing authority much greater flexibility to keep test questions current and confidential. In addition, where the performance indication 1150 is provided to the central computer 300 on an ongoing basis rather than after completion of the entire test, future test questions could be customized in response to the test-taker's ongoing or historical performance. To the extent that downloaded questions are not known in advance by the testing computer 200, they will be unscorable by the testing computer 200. In such cases, the encoded score code 100 transmitted from the testing computer 200 to the central computer 300 will include encoded but otherwise unscored test answers. The central computer 300 will then score the questions using an answer key as part of the test benchmark. Thus, as used in various exemplary embodiments of the invention disclosed herein, the term test benchmark could include any information useful for evaluating a test result transmitted from the testing computer 200 to the central computer 300. Furthermore, either or both of the score code and the test benchmark could include absolute, relative, or statistical information.

(4) At-Home Testing

Figure 14:
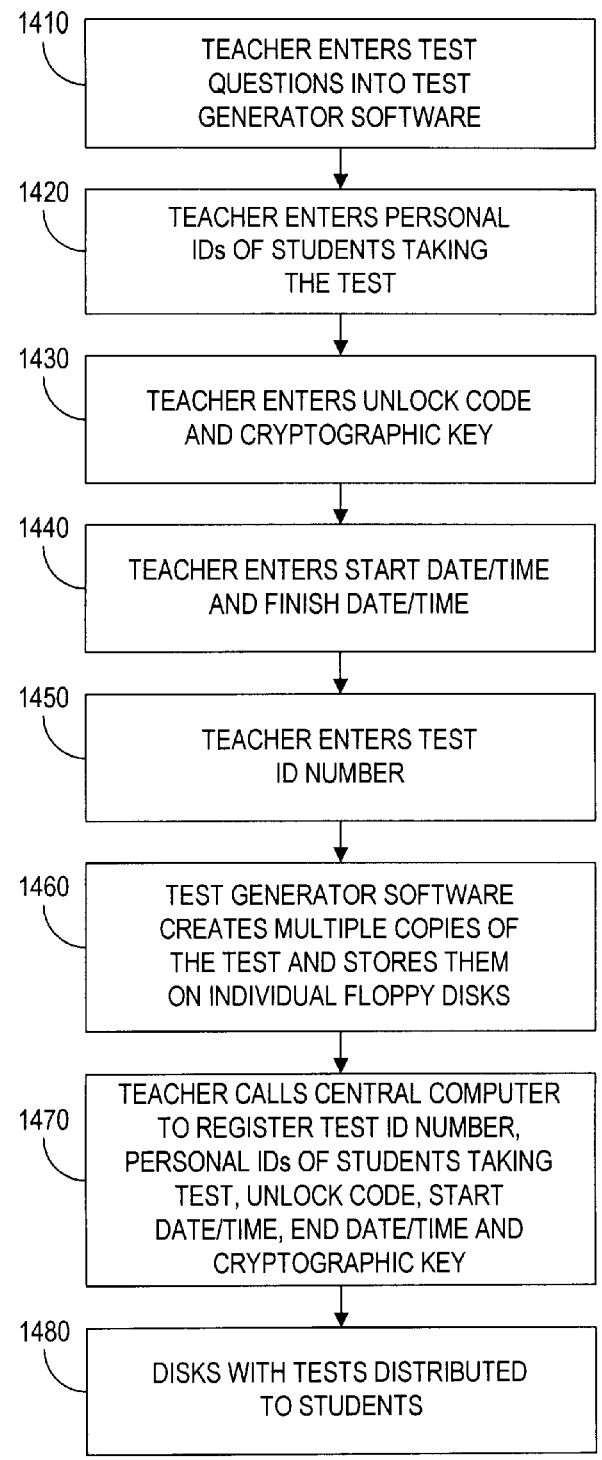
FIG. 14 illustrates an exemplary process for test question generation and distribution in a home testing application.

FIGS. 14–19 illustrate another embodiment of the invention in which the test questions are not pre-stored at the testing computer 200. Referring now to FIG. 14, there is shown an exemplary embodiment of a process for distributing tests to students for examinations taken at home. Teachers (or commercial testing services) create a set of floppy disks with test questions and distribute them to students to take the tests at a given start time. At stop 1410, the teacher enters the test questions into test generator software operating on a standard personal computer. At step 1420, the teacher enters the personal IDs of each student taking the test into the test generator software to ensure that only authorized students can take the test. At step 1430, the teacher enters an unlock code and one or more cryptographic keys of any desired type. The unlock code is used by the test-takers to activate the test session, while the cryptographic keys will be used by the students to encrypt their test results. At step 1440, the teacher enters both a start and finish date/time for the test, perhaps declaring that the test will begin at 1:00 PM on Saturday and end at 3:00 PM the same day. Lastly, the teacher enters a unique test ID number at step 1450, which allows the central computer 300 to track the results of the test.

At step 1460, the test generator software creates multiple copies of the test and stores the tests onto individual disks. The test disks can take many forms including floppy disks, tape cartridges, magneto-optical disks, etc. The disks do not have to be identical. Each disk's questions could be arranged in a different order, or each disk could contain different questions. For example, the teacher could enter a large number of questions into the generator software with randomly selected subsets of these questions to be generated for different disks.

The teacher completes the test generation process by calling the central computer 300 at step 1470, and using an IVRU or other electronic device to register the test ID number, personal IDs of the test-takers, unlock code, start time/stop time, and cryptographic key. The central computer 300 stores this information in a database for later use. At step 1480, the disks are distributed to the students.

Figure 15:
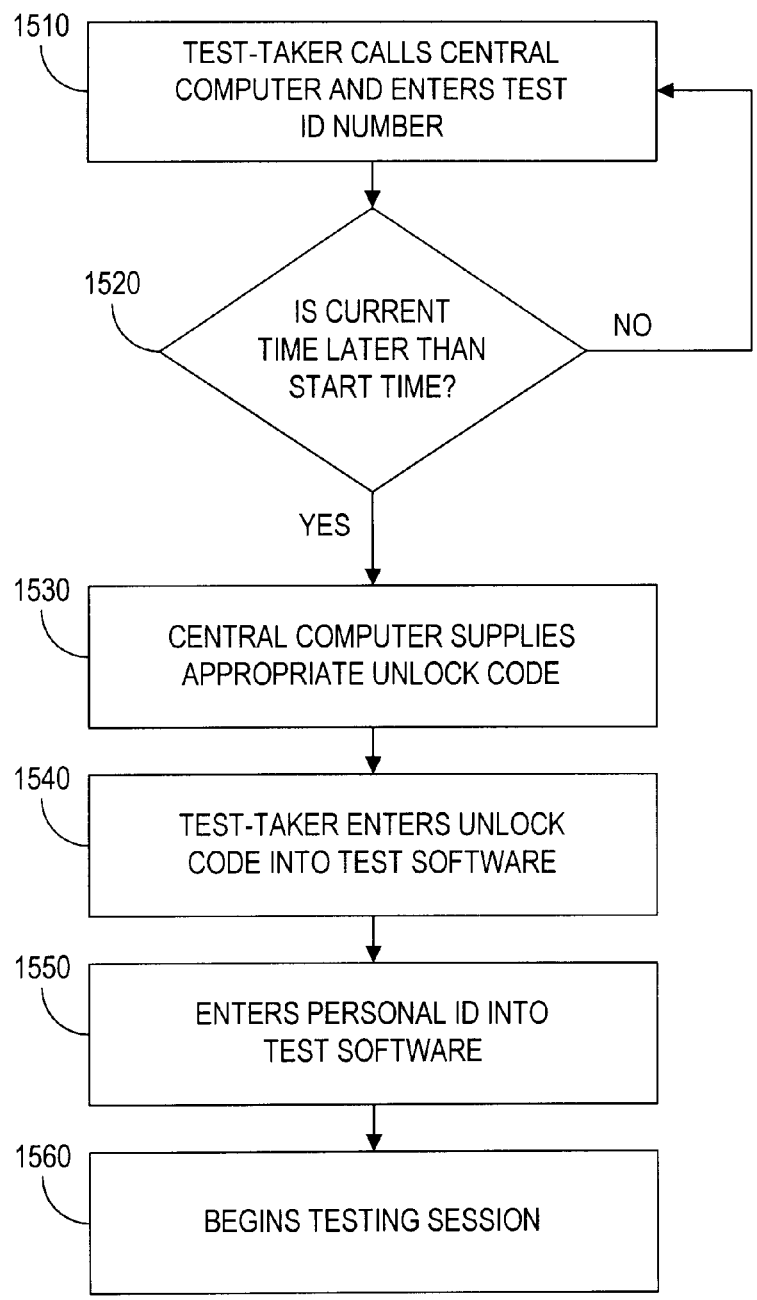
FIG. 15 illustrates an exemplary process for beginning a testing session in a home testing application.

Referring now to FIG. 15, there is shown an exemplary embodiment of a process for taking the distributed test. The test-taker brings the test disk home and inserts it into his testing computer 200. Without the appropriate unlock code, however, the test-taker is unable to access the test questions. At step 1510, therefore, the test-taker calls the central computer 300 and enters the test ID number. This ID number is preferably printed on the disk itself. The central computer 300 accesses the test database 380 and retrieves the database record for that particular test ID number. At step 1520, the central computer 300 compares the current time to the designated start time of the test. If the current time is prior to the test start time, the test-taker is instructed to call back at the established start time. If the current time is within the time window of the test, the central computer 300 supplies the appropriate unlock code at step 1530. At step 1540, the test-taker enters this unlock code into the educational software 272, allowing access to educational software 272. At step 1550 he enters his personal ID number. If either of these values is not accepted by the test software, the test-taker is prevented from continuing. At step 1560, the test-taker begins the testing session.

Figure 16:
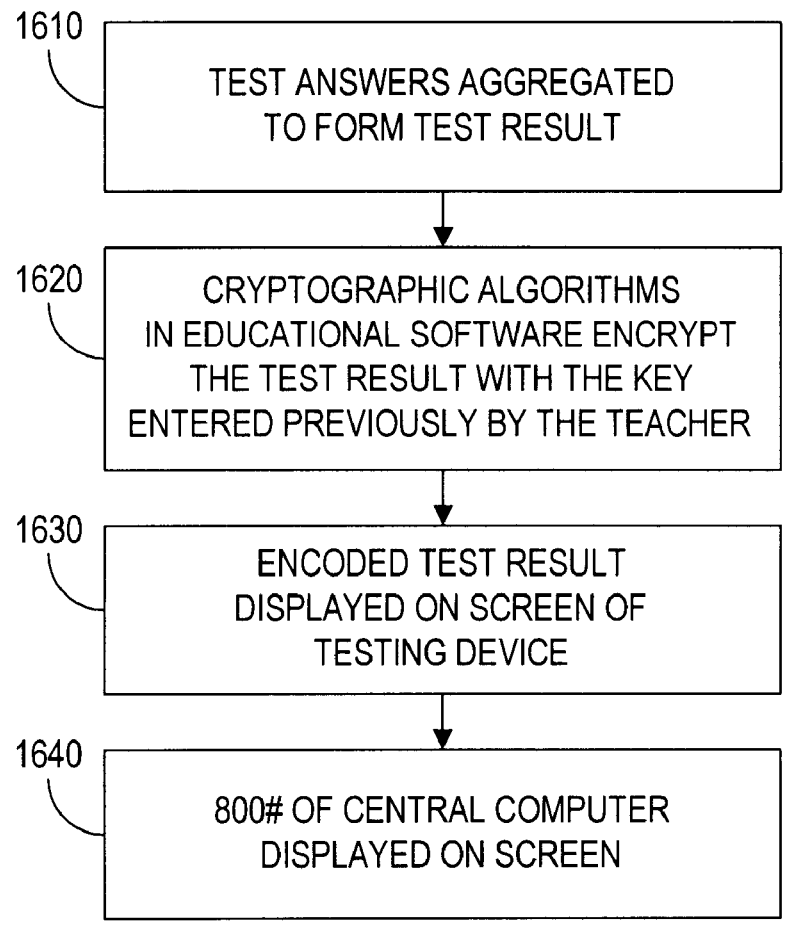
FIG. 16 illustrates an exemplary process for encoding a score code in a home testing application.

Referring now to FIG. 16, there is shown an exemplary embodiment for the process of encoding the test results for transmission to the central computer 300. At step 1610, the test-taker's answers are aggregated into a score code, which is encrypted at step 1620 by cryptographic algorithms in the educational software 272 using the key entered by the teacher at the time the disk was generated. At step 1630, the encoded score code 1100 is displayed on the video monitor 250 of the testing computer 200. At step 1640, the 800 number associated with the central computer 300 is similarly displayed.

Figure 17:
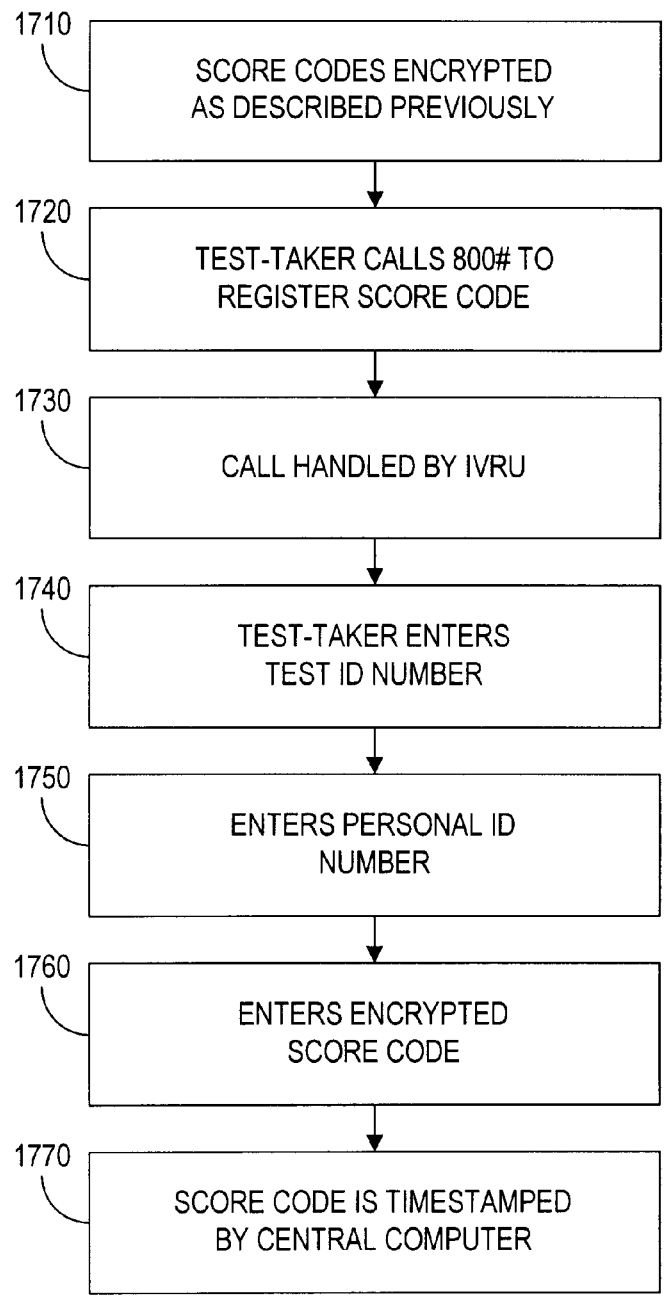
FIG. 17 illustrates an exemplary process for transmitting encoded score codes to the central computer in a home testing application.

Referring now to FIG. 17, there is shown an exemplary embodiment of a process for transmitting the encoded score codes 1100 to the central computer 300. As described previously, in step 1710 the score code 1100 is encrypted by the testing device 200. At step 1720, the test-taker calls the 800 number to register his score code with the central computer 300. At step 1730, the IVRU 370 handles the call and prompts the test-taker who, at step 1740, enters the test ID number. At step 1750, the test-taker enters his personal ID number and, at step 1760, enters the encoded score code 1100. The score code 1100 is timestamped by the central computer 300 at step 1770 so that it can be checked later for compliance with the established end time of the test.

Figure 18:
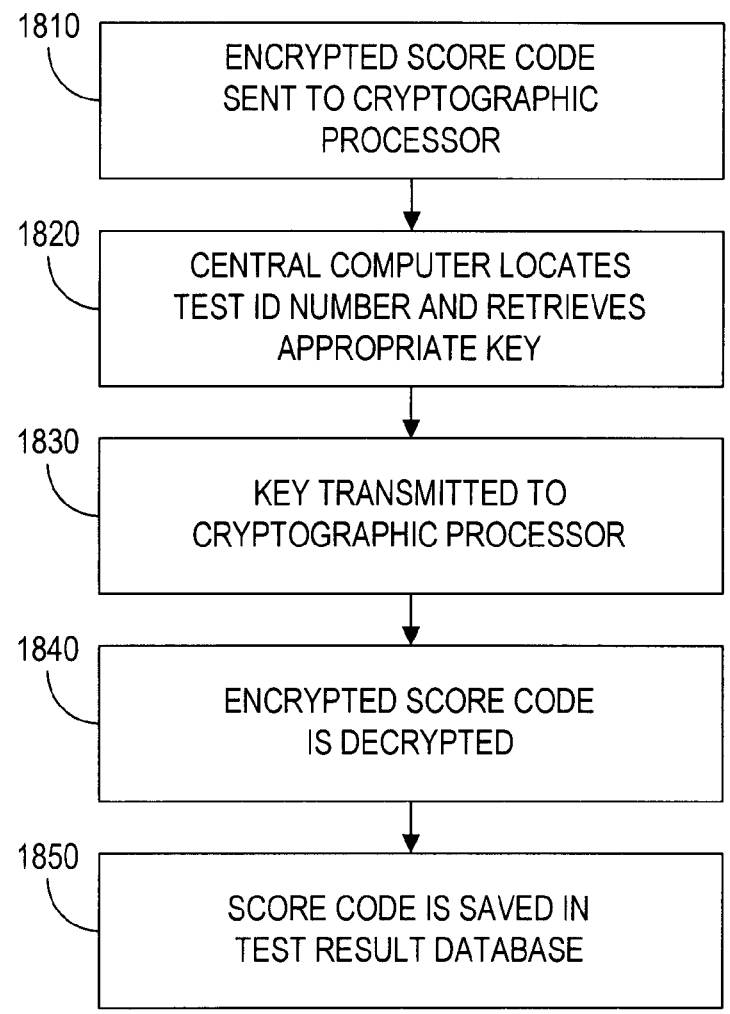
FIG. 18 illustrates an exemplary process for decoding and scoring a received encoded score code at the central computer in a home testing application.

Referring now to FIG. 18, there is shown an exemplary embodiment of a process for decoding the encoded score code 1100 within central computer 300. At step 1810, the encoded score code 1100 is sent to the cryptographic processor 320. At step 1820, the central computer 300 locates and retrieves the test ID number to find the cryptographic key used to encrypt the test result. This key is transmitted at step 1830 to the cryptographic processor 320 where, at step 1840, the encoded test result 1100 is decrypted and scored. The answer key used for scoring could have been previously transmitted from the teacher to the central computer 300 during the test registration process at step 1470 in FIG. 14. At step 1850, the scored test result is saved in the test result database 390.

Figure 19:
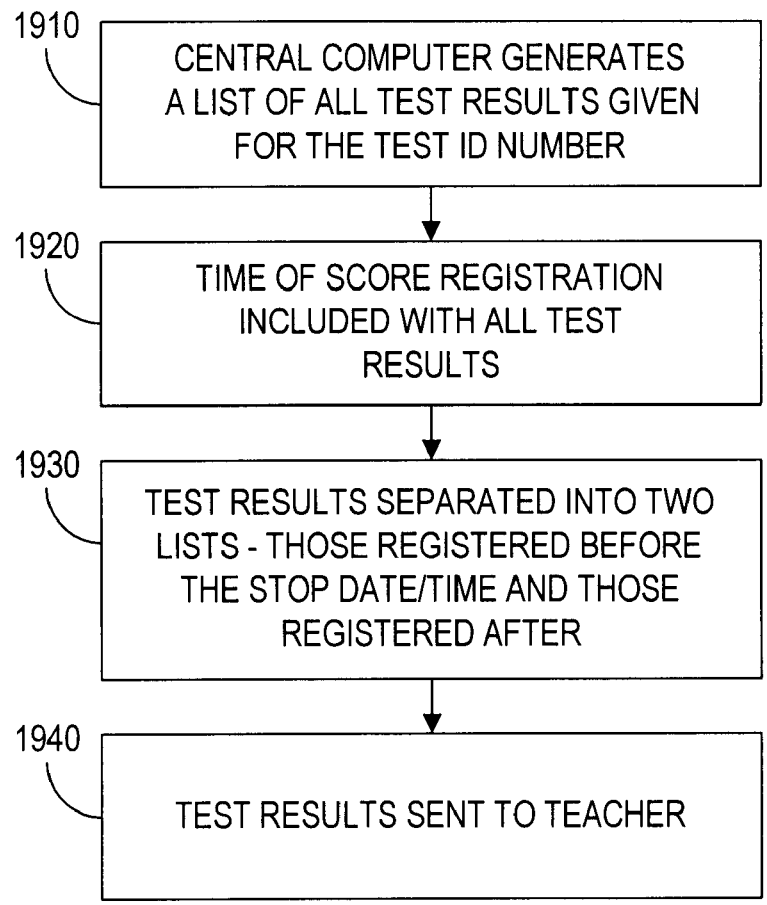
FIG. 19 illustrates an exemplary process for transmitting the scored test results to a teacher in a home testing application.

Referring now to FIG. 19, there is shown an exemplary embodiment of a process for transmitting the test results back to the teacher who generated the test. At step 1910, the central computer 300 generates a list of all test results for the given test ID number. Along with these test results at step 1920, are the timestamps associated with each test result. At step 1930, the test results are separated into two lists—those with timestamps before the stop date/time, and those with timestamps after the stop date/time. At step 1940, these test results are sent to the teacher. Test results whose timestamps exceed the pre-established end time for the test may be rejected or penalized in an appropriate manner.

In the above embodiment, the testing computer 200 transmits unscored test answers to the central computer 300 for scoring at the central computer 300. In a variation of the above embodiment, the test answers could be scored by the testing computer 200 before being transmitted to the central computer 300. This requires that an answer key be available to the testing computer 200 along with the test questions. This answer key may have been provided in encrypted form, along with the test questions, on the disk created by the teacher's test generator software and provided to the student prior to testing.

(5) Distributed Computing

In another embodiment of the invention, the educational software 272 could be programmed in a distributed computing language such as Sun's Java, that allows both the functional (testing algorithms) and non-functional (test content) aspects of the testing software to be integrated into "executable content" accessible from a remote server over the World Wide Web. Even more sophisticated distributed computing protocols allow the processing of information by different computers operating in a networked environment. Allowing the central computer 300 (or any other networked computer) to perform portions of the computational processing that would otherwise be performed by the testing computer 200 greatly reduces the cost of the testing computer 200, making it more affordable to a wider market. For example, rather than locally scoring the test questions, the testing computer 200 could upload the encoded, unscored answers to a networked computer for remote scoring.

In a similar manner, while the above embodiments describe a single computer acting as the central computer 300, those skilled in the art will realize that the functionality of the central computer 300 can be realized among a plurality of computers. Thus, in an alternative embodiment of the invention, the central computer 300 may be configured as a distributed architecture wherein the databases and cryptographic processors are housed in physically separate units. In such a configuration, each unit is in communication with its constituent parts, but the processor and/or data storage functions are performed by stand-alone units. This arrangement yields a more dynamic and flexible system, less prone to catastrophic hardware failures affecting the entire system.

For purposes of illustration only, and not to limit generality, the present invention has been explained with reference to various examples of time sources, cryptographic operations, output devices, and sensors. However, one skilled in the art will appreciate that the invention is not limited to the particular illustrated embodiments or applications, but includes many others that operate in accordance with the principles disclosed herein.

What is claimed is:

1. A computer system, comprising:

means for storing instructions and data comprising a test taker database having a record containing a test taker field representing a test taker identifying datum and a reward threshold field representing a reward threshold provided by an end user;

means for receiving a score code having said test taker identifying datum and a test score incorporated therein encoded by an electronic testing device associated with a test taker;

means for decoding said score code and distinguishing said test taker identifying datum from said test score;

means for retrieving said record of said test taker database corresponding to said test taker identifying datum and locating said corresponding reward threshold;

means for comparing said test score relative to said reward threshold; and means for providing a reward attainment message to said end user if said test score exceeds said reward threshold.

2. A computer system, comprising:

means for receiving a score code having a test taker identifying datum and a test score incorporated therein encoded by an electronic testing device associated with a test taker;

means for decoding said score code and distinguishing said test taker identifying datum from said test score;

means for comparing said test score with a plurality of stored test scores;

means for generating a performance indication based upon said comparison; and means for providing said performance indication to an end user.

3. The computer system of claim 2, further comprising means for storing instructions and data comprising a test taker database and a test result database;

wherein said test taker database comprises a record containing a test taker field representing said test taker identifying datum and a statistic field representing a statistical datum of said test taker;

wherein said test result database comprises a plurality of score records, each score record containing a test result field representing one of said stored test scores, a software field representing a corresponding software identifier and a benchmark field representing a test benchmark.

4. The computer system of claim 3, wherein said means for comparing said test score is further configured to:

retrieve said record from said test taker database and locate said statistical datum; and retrieve said plurality of score records from said test result database wherein said test benchmark is the same as said statistical datum.

5. The computer system of claim 4, wherein said test benchmark is a demographical identifier.

6. The computer system of claim 4, wherein said test benchmark is a geographical identifier.

7. The computer system of claim 3, wherein said test taker database further includes a reward threshold provided by said end user.

8. The computer system of claim 7, wherein said means for comparing said test score is further configured to locate said reward threshold, compare said test score relative to said reward threshold and provide a reward attainment message if said test score exceeds said reward threshold.

9. The computer system of claim 2, wherein said means for generating a performance indication is further configured to identify an area of weakness and generate a control message to said electronic testing device directing said electronic testing device to focus on said area of weakness during a subsequent testing session.

10. The computer system of claim 9, wherein said control message is provided with said performance indication to said end user.

11. A testing method, comprising the steps of:

a computer system receiving a score code having a test taker identifying datum and a test score incorporated therein encoded by an electronic testing device associated with a test taker;

said computer system decoding said score code and distinguishing said test taker identifying datum from said test score;

said computer system retrieving a record of a test taker database having a test taker field representing said test taker identifying datum and a reward threshold field representing a reward threshold provided by an end user;

said computer system comparing said test score relative to said reward threshold; and said computer system providing a reward attainment message to said end user if said test score exceeds said reward threshold.

12. A testing method, comprising the steps of:
   a computer system receiving a score code having a test taker identifying datum and a test score incorporated therein encoded by an electronic testing device associated with a test taker;
   said computer system decoding said score code and distinguishing said test taker identifying datum from said test score;
   said computer system comparing said test score with a plurality of stored test scores;
   said computer system generating a performance indication based upon said comparison; and
   said computer system providing said performance indication to an end user.

13. The testing method of claim 12, wherein said computer system comprises a memory device comprising a test taker database and a test result database;
   wherein said test taker database comprises a record containing a test taker field representing said test taker identifying datum and a statistic field representing a statistical datum of said test taker;
   wherein said test result database comprises a plurality of score records, each score record containing a test result field representing one of said stored test scores, a software field representing a corresponding software identifier and a benchmark field representing a test benchmark.

14. The testing method of claim 13, wherein the step of said computer system comparing said test score further comprises the steps of:
   retrieving said record from said test taker database and locating said statistical datum; and
   retrieving said plurality of score records from said test result database wherein said test benchmark is the same as said statistical datum.

15. The testing method of claim 14, wherein said test benchmark is a demographical identifier.

16. The testing method of claim 14, wherein said test benchmark is a geographical identifier.

17. The testing method of claim 13, wherein said test taker database further includes a reward threshold provided by said end user.

18. The testing method of claim 17, wherein the step of said computer system comparing said test score further comprises the steps of:
   locating said reward threshold;
   comparing said test score relative to said reward threshold; and
   providing a reward attainment message if said test score exceeds said reward threshold.

19. The testing method of claim 12, wherein the step of said computer system generating a performance indication further comprises the steps of:
   identifying an area of weakness; and
   generating a control message to said electronic testing device to direct said electronic testing device to focus on said area of weakness during a subsequent testing session.

20. The testing method of claim 19, wherein the step of said computer system providing said performance indication further comprises the step of providing said control message to said end user.

21. A computer system, comprising:
   means for receiving a test score encoded by an electronic testing device associated with a test taker;
   means for decoding said test score;
   means for comparing said test score against a reward threshold specified by an end user; and
   means for providing a reward attainment message to said end user if said test taker has attained said reward threshold.

22. A testing method, comprising the steps of:
   a computer system receiving a test score encoded by an electronic testing device associated with a test taker;
   said computer system decoding said test score;
   said computer system comparing said test score against a reward threshold specified by an end user; and
   said computer system providing a reward attainment message to said end user if said test taker has attained said reward threshold.

23. A computer device, comprising:
   means for administering a test to a test taker;
   means for generating a test score and incorporating said test score and a test taker identifying datum into a score code;
   means for encoding said score code; and
   means for transmitting said encoded score code to a central computer;
   wherein said central computer decodes said encoded score code and distinguishes said test taker identifying datum from said test score, retrieves a corresponding reward threshold, compares said test score relative to said reward threshold and provides a reward attainment message to an end user if said test score exceeds said reward threshold.

24. A testing method, comprising the steps of:
   administering a test to a test taker;
   generating a test score and incorporating said test score and a test taker identifying datum into a score code;
   encoding said score code; and
   transmitting said encoded score code to a central computer;
   wherein said central computer decodes said encoded score code and distinguishes said test taker identifying datum from said test score, retrieves a corresponding reward threshold, compares said test score relative to said reward threshold and provides a reward attainment message to an end user if said test score exceeds said reward threshold.

25. A computer-based method for evaluating the performance of an individual associated with an electronic testing device, comprising the steps of:
   (a) receiving an encoded test result, originating from said testing device, at a central computer;
   (b) decoding the received test result;
   (c) comparing the decoded test result with a test benchmark; and
   (d) providing a performance indication of the individual with respect to the test benchmark.

* * * * *